(12) United States Patent
Chen et al.

(10) Patent No.: US 12,026,122 B2
(45) Date of Patent: Jul. 2, 2024

(54) METHOD AND DEVICE FOR PROCESSING FILE USING AT LEAST TWO SUB-FILES SEPARATELY STORED IN AT LEAST TWO EQUIPMENTS

(71) Applicant: SAMSUNG ELECTRONICS CO., LTD., Gyeonggi-do (KR)

(72) Inventors: Xiao Chen, Beijing (CN); Xiaoyan Lou, Beijing (CN); Xuan Zhu, Beijing (CN); Yifei Guo, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/273,602

(22) PCT Filed: Sep. 5, 2019

(86) PCT No.: PCT/KR2019/011498
§ 371 (c)(1),
(2) Date: Mar. 4, 2021

(87) PCT Pub. No.: WO2020/050656
PCT Pub. Date: Mar. 12, 2020

(65) Prior Publication Data
US 2021/0357357 A1  Nov. 18, 2021

(30) Foreign Application Priority Data
Sep. 5, 2018 (CN) .......................... 201811034154.7

(51) Int. Cl.
*G06F 16/11* (2019.01)
*G06F 16/16* (2019.01)
(Continued)

(52) U.S. Cl.
CPC ............ *G06F 16/116* (2019.01); *G06F 16/16* (2019.01); *G06F 16/183* (2019.01); *G06F 16/41* (2019.01);
(Continued)

(58) Field of Classification Search
CPC ........ G06F 16/16; G06F 16/183; G06F 16/41; G06F 21/602; G06F 16/182; G06F 21/62; G06N 20/00; H04L 67/10
See application file for complete search history.

(56) References Cited

U.S. PATENT DOCUMENTS 8,335,807 B1 * 12/2012 Cerda, Jr. ............. G06F 16/182
709/201
9,152,643 B2 * 10/2015 Whitehead .............. G06F 16/86
(Continued)

FOREIGN PATENT DOCUMENTS

KR   1020150116720   10/2015
WO   WO 2017/183448   10/2017

OTHER PUBLICATIONS

Chinese Office Action dated Aug. 29, 2023 issued in counterpart application No. 201811034154.7, 26 pages.
(Continued)

*Primary Examiner* — Pierre M Vital
*Assistant Examiner* — Zuheir A Mheir
(74) *Attorney, Agent, or Firm* — The Farrell Law Firm, P.C.

(57) ABSTRACT

Embodiments of the present application provide a file processing method, a file processing device, an electronic apparatus, and a readable storage medium. The method comprises: receiving an operation request for a file, the file comprising at least two sub-files separately stored in at least two equipments; and correspondingly processing at least one sub-file of the file according to the operation request. By the solutions provided in the embodiments of the present application, since at least two sub-files of a file are separately stored in at least two equipments, original contents of the file cannot be obtained even if a sub-file in one equipment is leaked. By the solutions provided in the embodiments of the
(Continued)

present application, the security of files can be effectively improved.

13 Claims, 14 Drawing Sheets

(51) Int. Cl.
  *G06F 16/182* (2019.01)
  *G06F 16/41* (2019.01)
  *G06F 21/60* (2013.01)
  *G06N 20/00* (2019.01)
  *H04L 67/10* (2022.01)

(52) U.S. Cl.
  CPC ........... *G06F 21/602* (2013.01); *G06N 20/00* (2019.01); *H04L 67/10* (2013.01)

(56) References Cited

U.S. PATENT DOCUMENTS

| | | | | |
|---|---|---|---|---|
| 2004/0088380 A1* | 5/2004 | Chung | ............... | H04N 21/8456 709/219 |
| 2009/0002507 A1* | 1/2009 | Fukuhara | ............... | H04N 5/232 348/222.1 |
| 2012/0259901 A1* | 10/2012 | Lee | ......... | G06F 16/27 707/827 |
| 2012/0290579 A1* | 11/2012 | Nomoto | .................. | G06F 16/10 707/E17.089 |
| 2013/0166613 A1* | 6/2013 | Ozaki | .................... | G06F 3/0613 707/827 |
| 2014/0025917 A1* | 1/2014 | Kaczmarczyk | ..... | G06F 11/1448 711/173 |
| 2014/0089258 A1* | 3/2014 | She | ......... | G06F 16/328 707/609 |
| 2015/0113010 A1 | 4/2015 | Muthyala et al. | | |
| 2015/0149716 A1 | 5/2015 | Hagspiel et al. | | |
| 2015/0287442 A1 | 10/2015 | Cho | | |
| 2015/0365644 A1* | 12/2015 | Kawakami | ........... | H04N 19/172 348/231.1 |
| 2015/0374313 A1* | 12/2015 | Kogure | .................. | H04N 19/63 382/131 |
| 2017/0109371 A1* | 4/2017 | Zheng | ................. | H04L 67/1097 |
| 2017/0316208 A1* | 11/2017 | Coronado | ............... | G06F 16/17 |
| 2018/0196948 A1* | 7/2018 | Chen | .................... | G06F 21/6209 |
| 2019/0132586 A1* | 5/2019 | Nagumo | ............... | H04N 19/124 |

OTHER PUBLICATIONS

PCT/ISA/210 Search Report issued on PCT/KR2019/011498, dated Dec. 17, 2019, pp. 3.
PCT/ISA/237 Written Opinion issued on PCT/KR2019/011498, dated Dec. 17, 2019, pp. 6.
Chinese Office Action dated Apr. 26, 2024 issued in counterpart application No. 201811034154.7, 28 pages.

* cited by examiner

[Fig. 1]
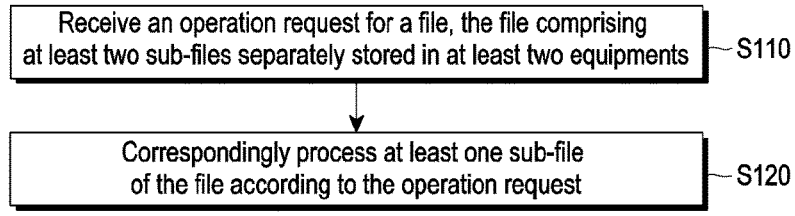
[Fig. 2a]
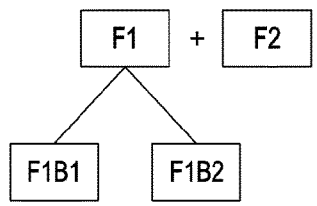
[Fig. 2b]
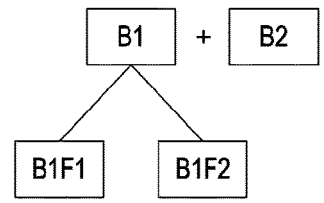
[Fig. 2c]
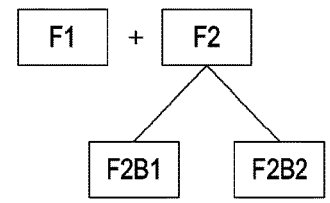
[Fig. 2d]
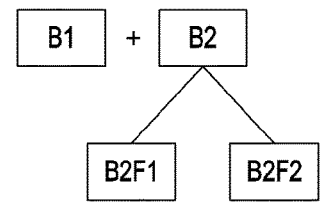
[Fig. 3]
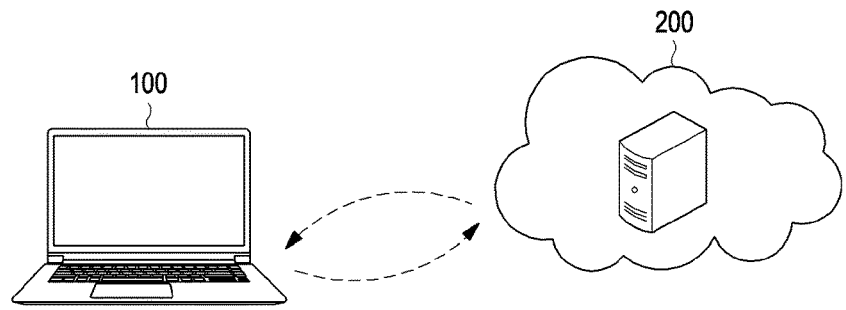

[Fig. 6a]
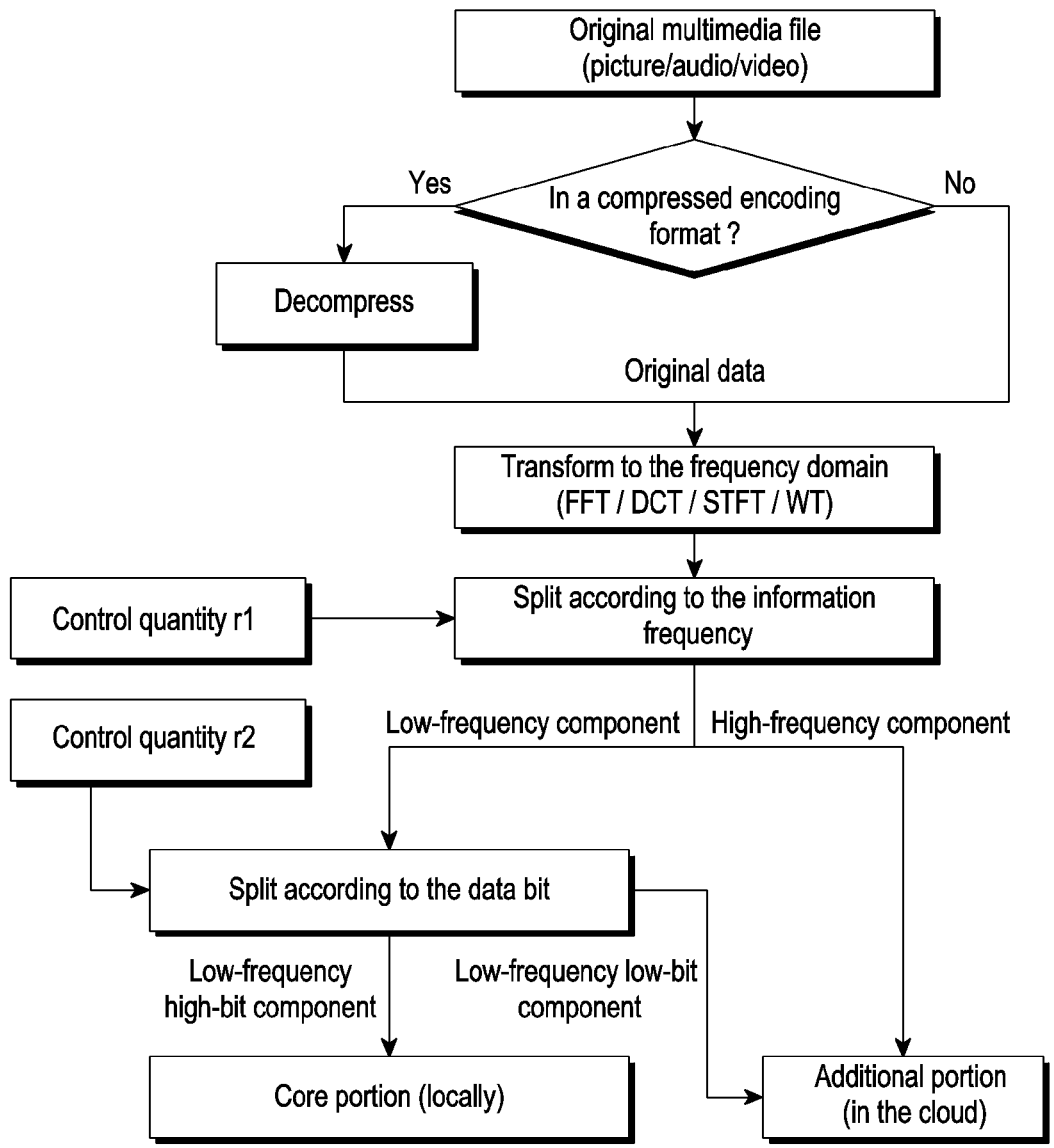
[Fig. 6b]
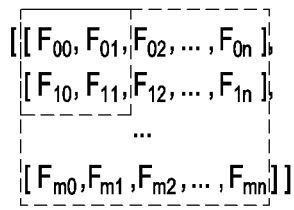
[Fig. 6c]

[Fig. 11]
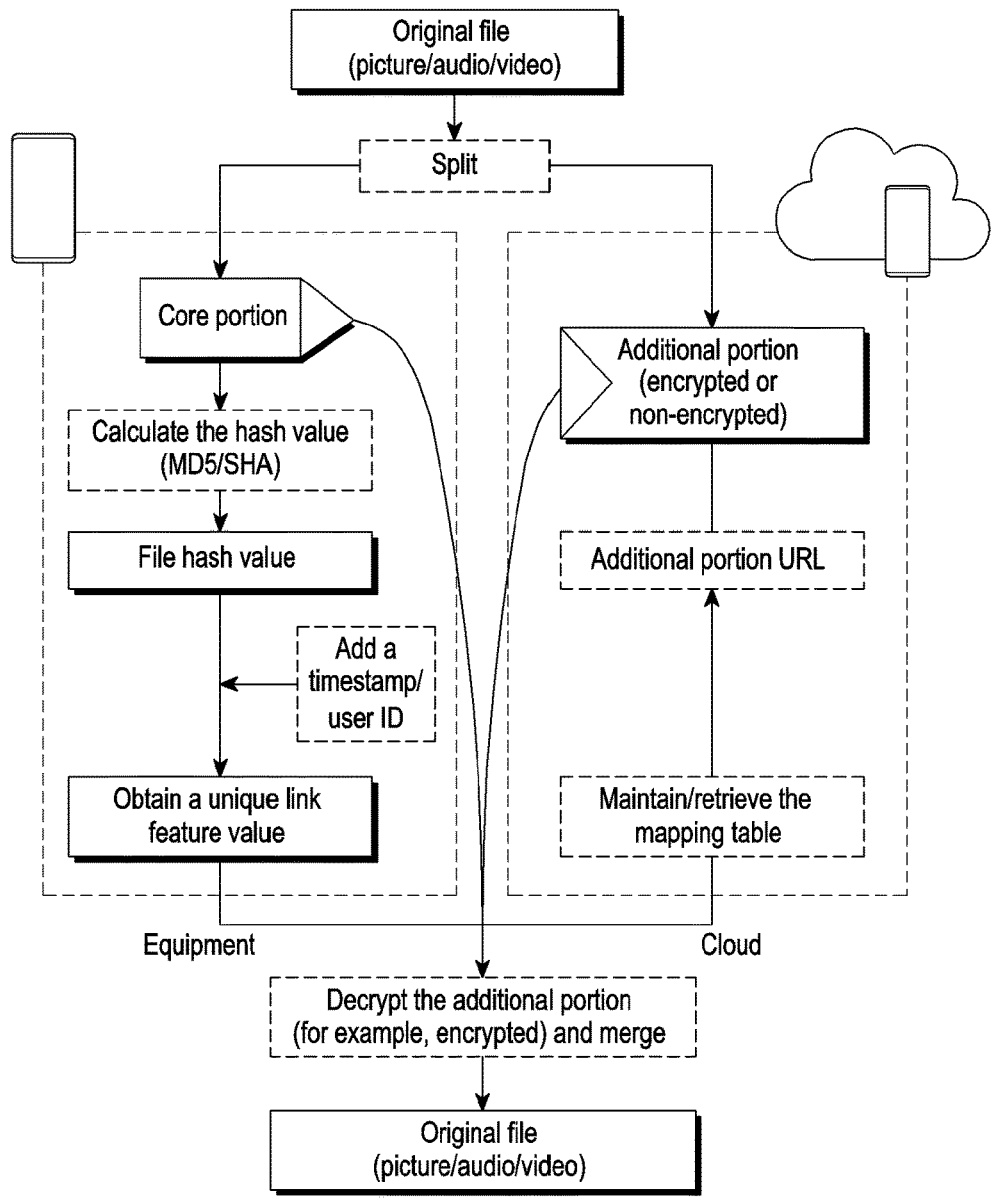
[Fig. 12]
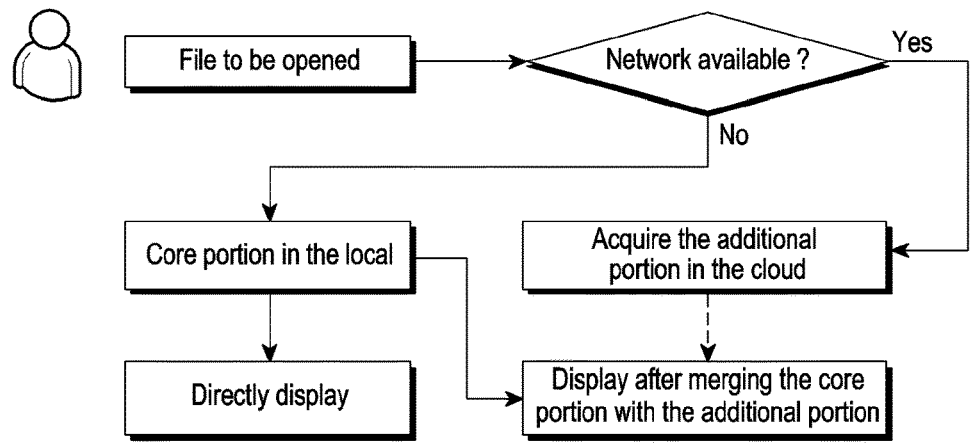

[Fig. 14a]
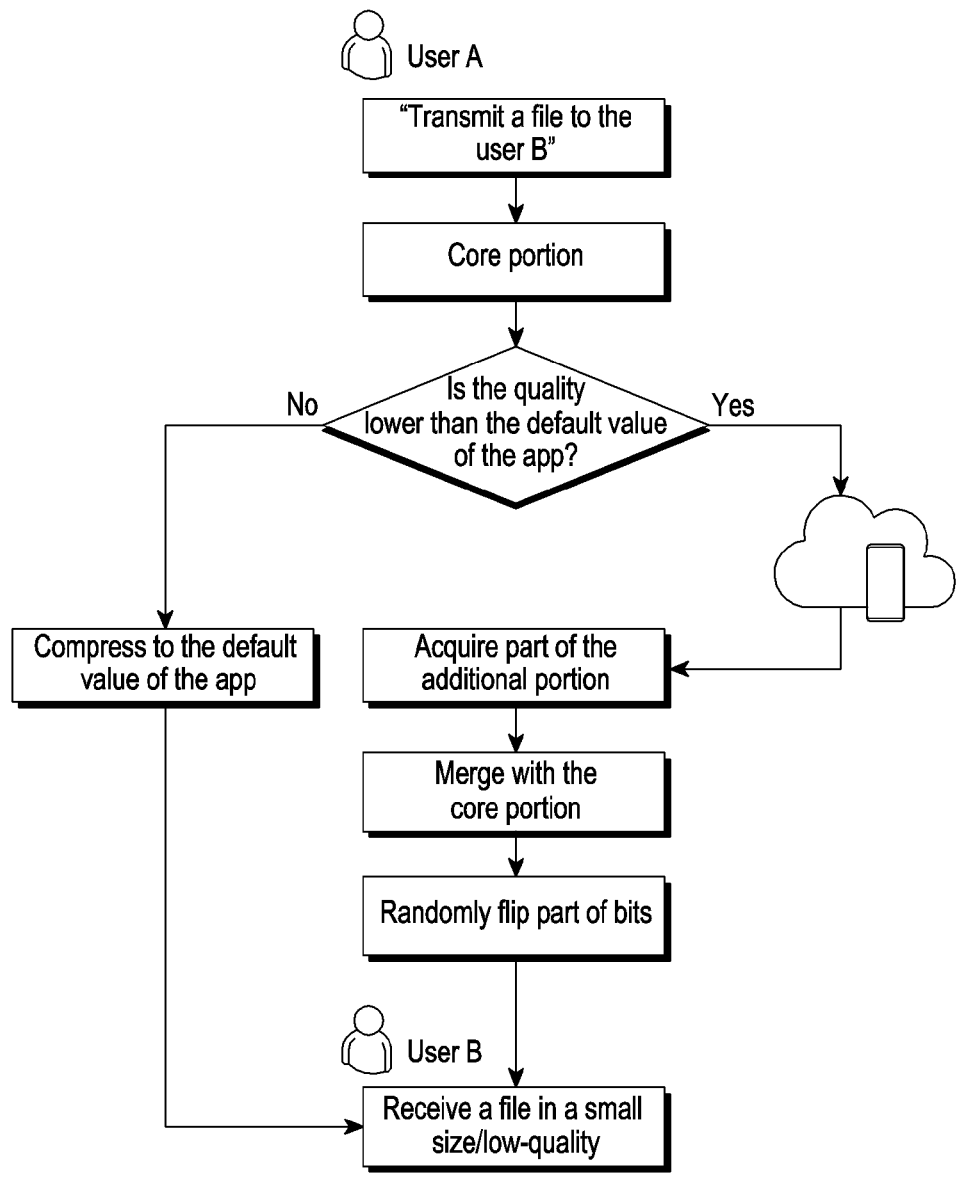

[Fig. 14b]
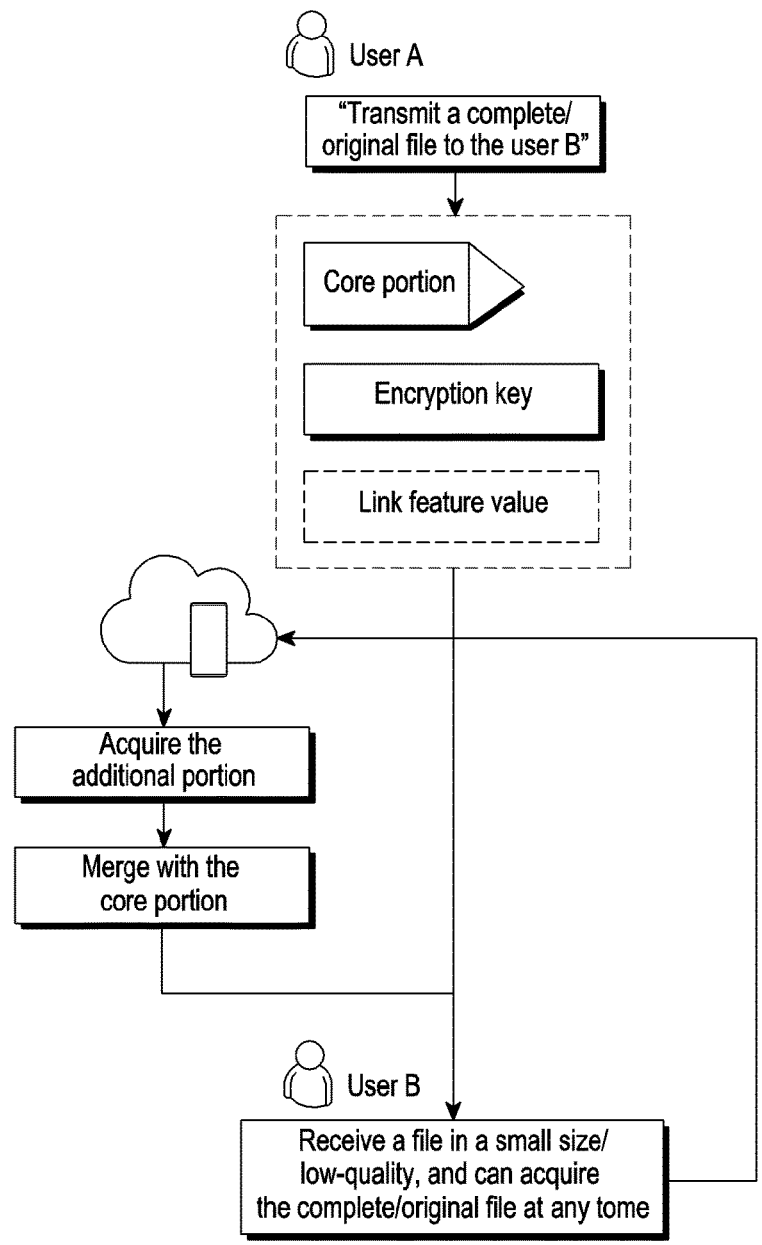
[Fig. 15]
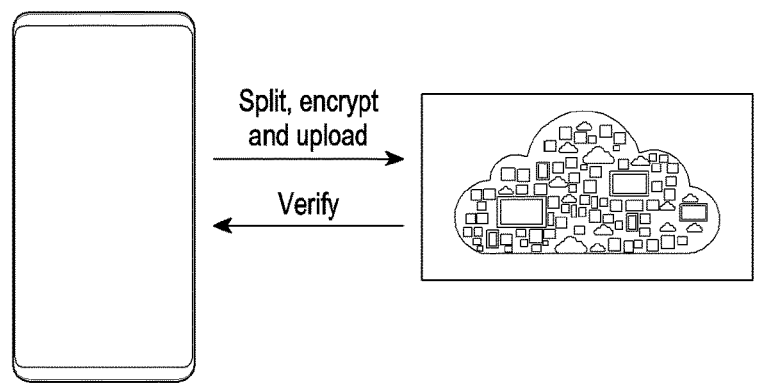

[Fig. 16]
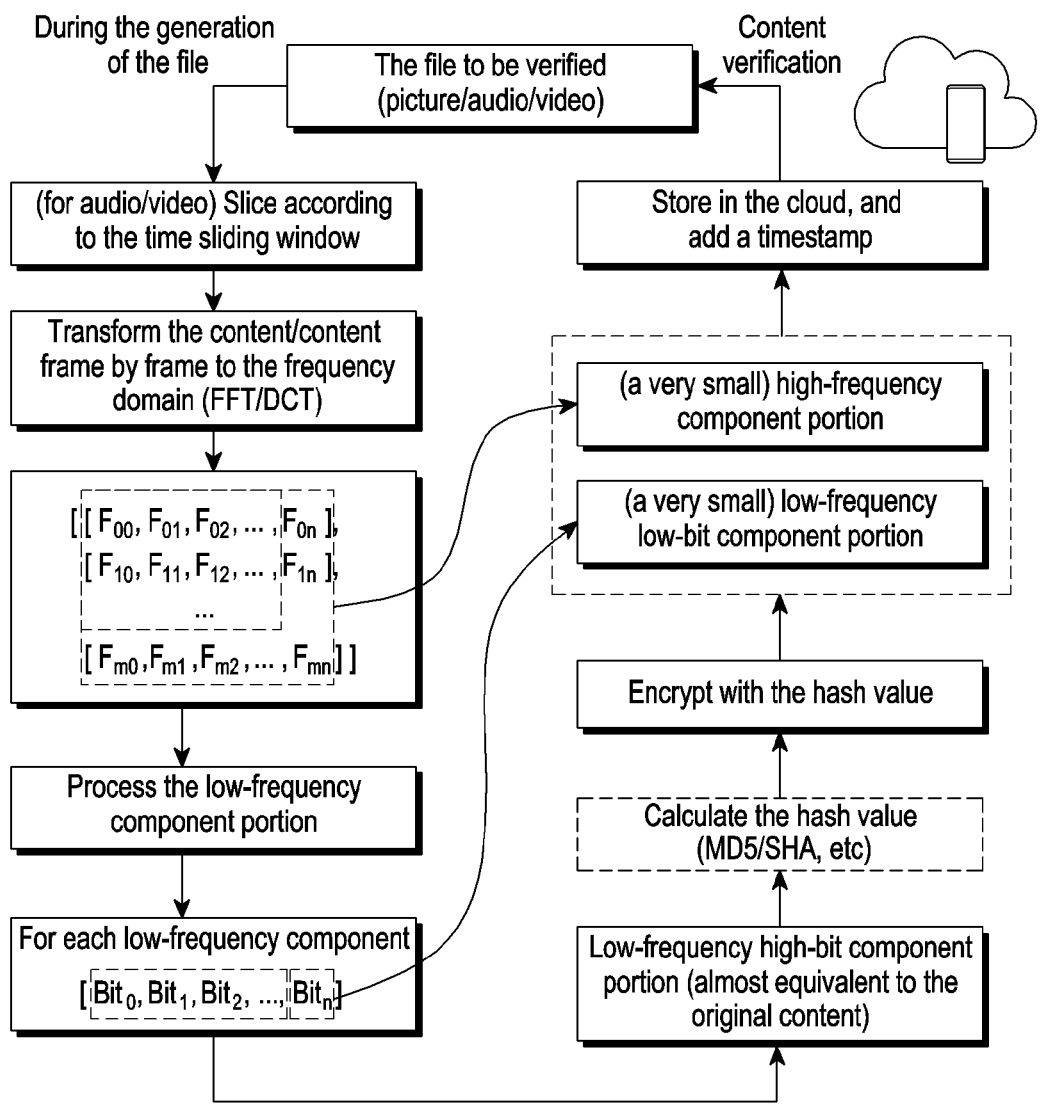

[Fig. 17]
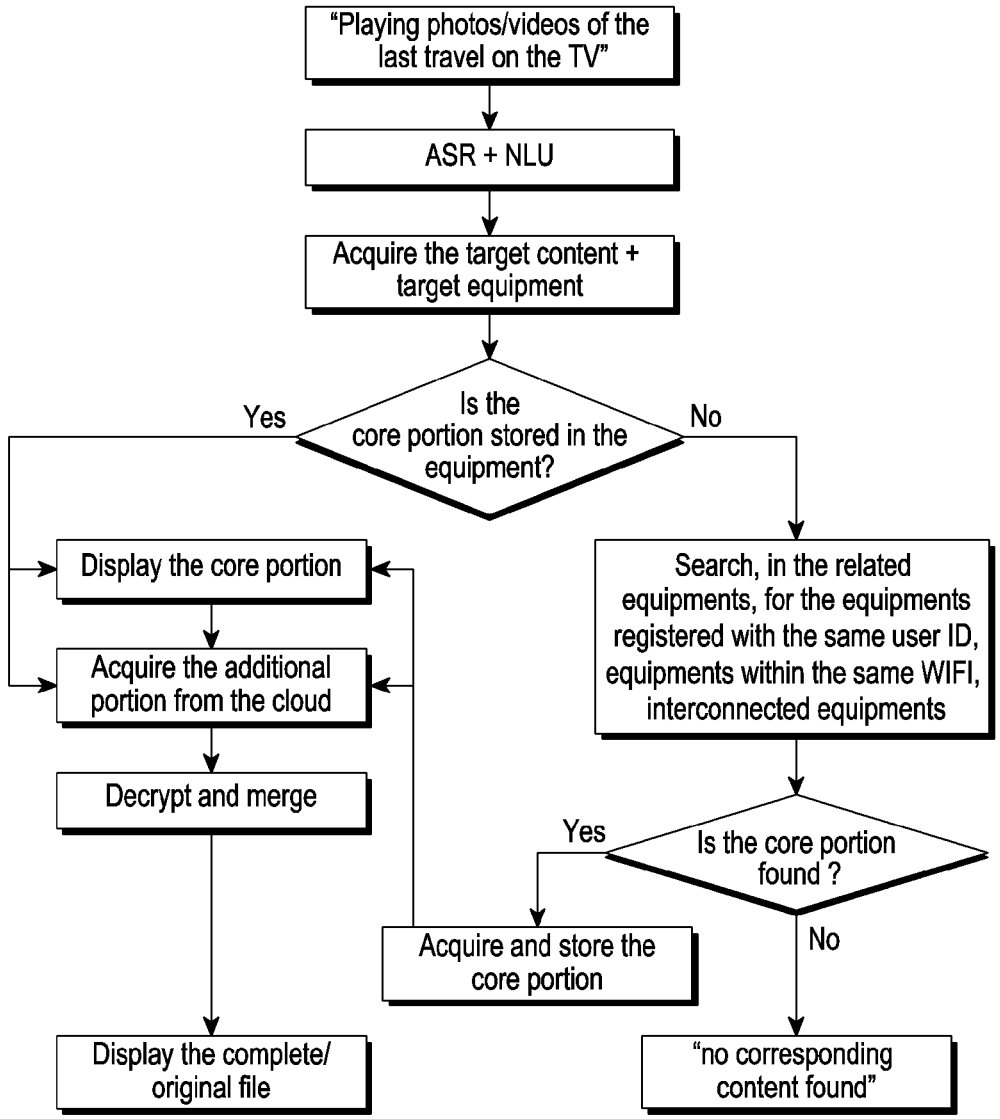
[Fig. 18]
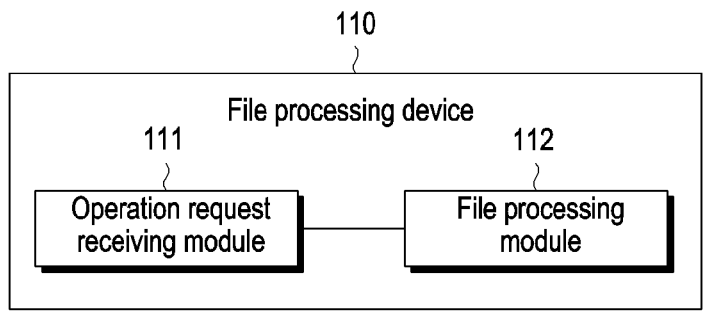

[Fig. 19]
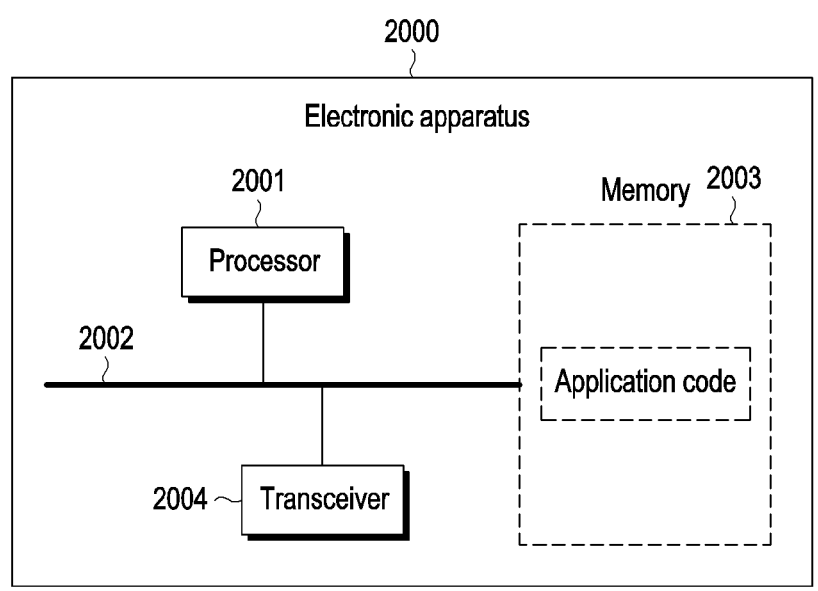

METHOD AND DEVICE FOR PROCESSING FILE USING AT LEAST TWO SUB-FILES SEPARATELY STORED IN AT LEAST TWO EQUIPMENTS

PRIORITY

This application is a National Phase Entry of PCT International Application No. PCT/KR2019/011498, which was filed on Sep. 5, 2019, and claims priority to Chinese Patent Application No. 201811034154.7, which was filed on Sep. 5, 2018, the contents of each of which are incorporated herein by reference.

1. FIELD

The present disclosure relates to the technical field of data processing, and in particular to a file processing method, a file processing device, an electronic apparatus and a readable storage medium.

2. DESCRIPTION OF THE RELATED ART

In daily work and life, since it is difficult to keep a large number of files such as pictures/music/videos in terminal equipments due to their limited storage space, users often need to store files in another equipment, in order to enable the terminal equipments to operate normally and to save the desired files for a long period of time for the purpose of backup.

Although, with the existing backup solutions, the storage space of the terminal equipments can be released to enable the terminal equipments to operate better, files stored in another equipment are low in security, and thus there is a risk of leakage of contents of the files, which may cause loss to users.

SUMMARY

An objective of the present disclosure is to solve at least one of the above technical defects. The present disclosure employs the following technical solutions.

In a first aspect, an embodiment of the present disclosure provides a file processing method, comprising:

receiving an operation request for a file, the file comprising at least two sub-files separately stored in at least two equipments; and correspondingly processing at least one sub-file of the file according to the operation request.

In a second aspect, an embodiment of the present disclosure provides a file processing device, comprising:

an operation request receiver configured to receive an operation request for a file, the file comprising at least two sub-files separately stored in at least two equipments; and a file processor configured to correspondingly process at least one sub-file of the file according to the operation request.

In a third aspect, an embodiment of the present disclosure provides an electronic apparatus, comprising a memory and a processor; the memory stores computer instructions; and, the processor is configured to invoke the computer instructions to execute the file processing method according to the first aspect of the present disclosure.

In a fourth aspect, an embodiment of the present disclosure provides a computer-readable storage medium storing computer programs that, when executed by a processor, enable the file processing method according to the first aspect of the present disclosure.

The technical solutions provided in the embodiments of the present disclosure have the following beneficial effects. In the file processing method, the file processor, the electronic apparatus and the readable storage medium provided in the embodiments of the present disclosure, since at least two sub-files of a file are separately stored in at least two equipments, original contents of the file cannot be obtained even if a sub-file in one equipment is leaked. Therefore, by the solutions provided in the embodiments of the present disclosure, the security of files can be effectively improved.

BRIEF DESCRIPTION OF DRAWINGS

To describe the technical solutions in the embodiments of the present disclosure more clearly, the accompanying drawings to be used in the description of the embodiments of the present disclosure may be briefly described below.

FIG. 1 shows a schematic flowchart of a file processing method according to an embodiment of the present disclosure;

FIGS. 2a, 2b, 2c and 2d show schematic diagrams of four different methods for splitting a core portion and an additional portion according to an embodiment of the present disclosure, respectively;

FIG. 3 shows a schematic diagram of a network architecture to which an embodiment of the present disclosure is applied;

FIG. 6a shows a schematic diagram of splitting a file based on a frequency-domain feature according to an example of the present disclosure;

FIGS. 6b and 6c shows a schematic diagram of further splitting frequency-domain elements based on a data bit feature according to an example of the present disclosure;

FIG. 11 shows a schematic diagram of a method for acquiring a file based on a link feature according to an example of the present disclosure;

FIG. 12 shows a schematic flowchart of a file processing method according to an example of the present disclosure;

FIG. 14a shows a schematic flowchart of a file transmitting method according to an example of the present disclosure;

FIG. 14b shows a schematic flowchart of a file transmitting method according to another example of the present disclosure;

FIG. 15 shows a principle diagram of realizing file content verification according to an example of the present disclosure;

FIG. 16 shows a schematic flowchart of a method for realizing file content verification according to an example of the present disclosure;

FIG. 17 shows a schematic flowchart of a multi-equipment collaboration method according to an example of the present disclosure;

FIG. 18 shows a schematic structure diagram of a file processor according to an embodiment of the present disclosure; and FIG. 19 shows a schematic structure diagram of an electronic apparatus according to an embodiment of the present disclosure.

DETAILED DESCRIPTION

Figure 4:
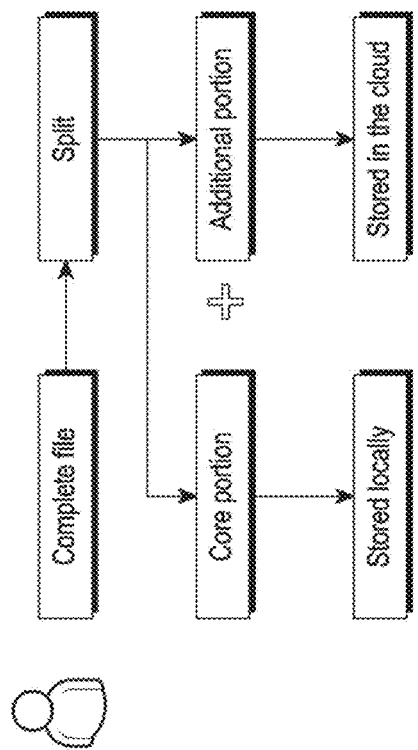
FIG. 4 shows a principle diagram of the splitting and storage of a file according to an embodiment of the present disclosure.

The embodiments of the present disclosure may be described in detail hereinafter. The examples of these embodiments have been illustrated in the accompanying drawings throughout which same or similar reference numerals refer to same or similar elements or elements having same or similar functions. The embodiments to be described below with reference to the accompanying drawings are illustrative, merely used for explaining the present disclosure and should not be regarded as any limitations thereto.

It should be understood by a person of ordinary skill in the art that singular forms "a", "an", "the", and "said" used here may be intended to include plural forms as well, unless otherwise stated. It should be further understood that terms "comprise/comprising" used in the specification of the present disclosure specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

The technical solutions of the present disclosure and how to solve the above technical problems by the technical solutions of the present disclosure may be described below in detail by specific embodiments. The following several specific embodiments can be combined with each other, and the same or similar concepts or processes may not be repeated in some embodiments. The embodiments of the present disclosure may be described below with reference to the accompanying drawings.

FIG. 1 shows a schematic flowchart of a file processing method according to the present disclosure. As shown in FIG. 1, the method may comprise the following steps.

Step S110: receiving an operation request for a file, the file comprising at least two sub-files separately stored in at least two equipments.

Step S120: correspondingly processing at least one sub-file of the file according to the operation request.

In the present disclosure, the file may comprise but be not limited to a text file, a multimedia file, etc., and the multimedia file may comprise but be not limited to one of a video file, a picture file, an audio file, etc.

In the file processing method provided in this embodiment of the present disclosure, since at least two sub-files of a file are separately stored in at least two equipments, original contents of the file cannot be obtained even if a sub-file in one equipment is leaked. By this method, the security of files can be effectively improved.

In an alternative embodiment of the present disclosure, at least one sub-file of the file may be stored locally; and/or, at least one sub-file of the file may be stored in another equipment.

The "local" can be interpreted as being local to an equipment for executing the file processing method, and at least one sub-file of the file being stored locally can be interpreted as at least one sub-file of the file being stored in a local storage space of the equipment for executing the file processing method. The "local" and the equipment for executing the file processing method can also be called a local equipment.

In practical applications, at least one sub-file of the file is locally stored in the equipment, so that the equipment can process this sub-file more quickly and conveniently. The another equipment can be various types of equipments except for the local equipment, for example, a server, a terminal equipment or more.

It should be understood that, in practical applications, there may be one or more another equipments. For example, the file may comprise a sub-file 1, a sub-file 2 and a sub-file 3, wherein the sub-file 1 may be stored locally, the sub-file 2 may be stored in a cloud server, and the sub-file 3 may be stored in another cloud server or other terminal equipments. By storing the sub-files of the file in multiple equipments, the security of the file is further improved.

In an optional implementation, the another equipment is optionally a cloud server.

In the existing cloud storage methods based on a cloud server, if a malicious user (not the uploader) acquires the cloud access password or passes or bypasses the identity authentication in other improper methods, the uploaded user's privacy may be leaked. If a malicious user directly accesses to the contents stored in the cloud server in an improper method and breaks the encryption, the uploaded user's privacy may be leaked. If a network transmission link is maliciously monitored/intercepted, the user's privacy may be leaked. If the cloud storage provider does not follow the commercial ethics and the laws and accesses to the user information without permission, the user's privacy may be leaked. By one implementation of this embodiment of the present disclosure, since a part of a file is stored locally and the other part thereof is stored in a cloud server, the whole file cannot be obtained even if the part of the file in the cloud server is leaked, so that the security of the file is improved.

It is to be noted that the executive subject of the file processing method shown in FIG. 1 may be a local equipment in which at least one sub-file of the file may be stored, or may be another equipment that stores at least one sub-file of the file. By taking another equipment being a cloud server as example, the cloud server can correspondingly process, according to the received operation request for a file transmitted by a terminal equipment, the stored sub-file corresponding to this file, for example, transmitting the stored sub-file to another equipment or performing edition or other operations on the stored sub-file according to the operation request; and, it is also possible that the cloud server instructs another equipment storing this sub-file to perform corresponding processing according to the received operation request.

In an optional embodiment of the present disclosure, each sub-file of the file may be obtained by splitting. Further, each sub-file of the file may be obtained by splitting based on a frequency-domain feature and/or a data bit feature of the file.

The frequency-domain feature may comprise a frequency-domain feature value of a frequency-domain element of the file. Specifically, the frequency-domain feature value may be the magnitude/amplitude of a frequency component of the frequency-domain element. Frequency-domain elements corresponding to the file may be obtained by performing frequency domain transformation on the file.

In practical applications, according to different actual attribute information of the file, before performing the frequency domain transformation on the file, it may be necessary to correspondingly preprocess the file to obtain original data of the file. The preprocessing may comprise but be not limited to decompression and/or decryption or other processing methods.

For example, in an example, if the file is a file in a compressed encoding format, it is necessary to decompress the file into original data before the frequency domain transformation. It is to be noted that the compressed encoding format is a compressed encoding format of a multimedia file. For example, for a picture, jpeg and png are compressed encoding formats; and, for an audio/video, mp3 and ogg are compressed encoding formats. If it is determined that a multimedia file is in a compressed encoding format, the multimedia file may be decompressed to obtain original data of the multimedia file so that it is convenient for the subsequent splitting of the original data. For example, for a picture in jpeg, png or other compressed encoding formats, the picture may be decompressed into bmp (bitmap); and, for an audio/video in mp3, ogg or other compressed encoding formats, the audio/video may be decompressed into wav.

The data bit feature refers to a high bit or low bit of the storage location of the file when stored in an equipment. It should be understood that the high bit and the low bit are relative. For example, in a binary storage mode, relative to a high bit, a low bit represents the right part of binary digit. Of course, the number of high bit and low bit may also be different according to different application requirements. For example, for a piece of specific binary data 0011, the right part is relative high bits, and the right part is relative low bits. For example, it is possible to regard 11 as low bits and 00 s high bits; or, it is also possible to regard left 001 as high bits and the rightmost 1 as a low bit.

When the file is a multimedia file such as an audio, a picture or a video, each sub-file of the file may be obtained by splitting based on one or two of a frequency-domain feature and a data bit feature of the file; and, when the file is a text file, each sub-file may be obtained by splitting based on a data bit feature of the file.

In an optional embodiment of the present disclosure, at least one sub-file of the file comprises at least one of the following:
 a first portion or a second portion obtained by splitting based on a frequency-domain feature of the file, wherein a frequency-domain feature value of a frequency-domain element of the second portion is greater than a frequency-domain feature value of a frequency-domain element of the first portion;
 a third portion or a fourth portion obtained by splitting based on a data bit feature of the file, wherein a data bit of the fourth portion is higher than a data bit of the third portion;
 a fifth portion and a sixth portion obtained by splitting based on a data bit feature of the first portion or a data bit feature of the second portion, wherein a data bit of the fifth portion is higher than a data bit of the sixth portion; and
 a seventh portion and an eighth portion obtained by splitting based on a frequency-domain feature of a frequency-domain element of the third portion or a frequency-domain feature of a frequency-domain element of the fourth portion, wherein a frequency-domain feature value of a frequency-domain element of the eighth portion is greater than a frequency-domain feature value of a frequency-domain element of the seventh portion.

For ease of description, a portion having a greater frequency-domain feature value of a frequency-domain element is called a high-frequency component, a portion having a less frequency-domain feature value of a frequency-domain element is called a low-frequency component, a portion having a higher data bit is called a high-bit component, and a portion having a lower data bit is called a low-bit component. Among the above corresponding portions, the first portion may be called a low-frequency component, the second portion may be called a high-frequency component, the third portion may be called a low-bit component, the fourth portion may be called a high-bit component, the fifth portion may be called a low-frequency high-bit component or a high-frequency high-bit component, the sixth portion may be called a low-frequency low-bit component or a high-frequency low-bit component, the seventh portion may be called a low-bit low-frequency component or a high-bit low-frequency component, and the eighth portion may be called a low-bit high-frequency component or a high-bit high-frequency component.

In practical applications, the size of the sub-file corresponding to each portion may be obtained based on a target split ratio for each sub-file (referring to the specific decryption hereinafter). The target split ratio may be preset as required or may be determined in real time.

For example, in an optional implementation, high-frequency components and low-frequency components may be classified based on a set threshold for the frequency-domain feature value or threshold for the number of frequency-domain elements, and high-bit components and low-bit components may be classified based on a threshold for the data bit feature or a threshold for the number of data bits. Specifically, it is possible that a portion corresponding to frequency elements having a frequency-domain feature value less than a first threshold among the frequency-domain elements of the file is used as a first portion while the remaining portion is used as a second portion, or it is also possible that a portion corresponding to a number of frequency-domain elements, that is equal to a second threshold, having a low frequency-domain feature value among the frequency-domain elements of the file is used as a first portion while the remaining portion is used as a second portion; and, it is possible that a portion corresponding to a number of high data bits equal to a third value in the data bit feature of the file is used as fourth portion while the remaining portion is used as a third portion, or it is also possible that a portion corresponding to data bits greater than a fourth threshold among the data bits of the file in an order from low bits to high bits is used as a fourth portion while the remaining portion is used as a third portion.

Similarly, the same method may be used when the fifth portion, the sixth portion, the seventh portion and the eighth portion are obtained by splitting based on the first portion, the second portion, the third portion and the fourth portion. As an example, for example, it is possible that a portion corresponding to a number of high data bits equal to a fifth threshold in the data bit feature corresponding to the first portion is used as a fifth portion and the remaining portion of the first portion is used as a sixth portion.

In an optional embodiment of the present disclosure, among the portions obtained based on the frequency-domain feature and/or data bit feature of the file, a sub-file including the first portion is stored locally, and a sub-file including the second portion is stored in another equipment (method 1); or, a sub-file including the fourth portion is stored locally, and a sub-file including the third portion is stored in another equipment (method 2); or, a sub-file including the fifth portion obtained based on the first portion is stored locally, and a sub-file including the second portion and the sixth portion obtained based on the first portion is stored in another equipment (method 3); or, a sub-file including the first portion and the fifth portion obtained based on the second portion is stored locally, and a sub-file including the sixth portion obtained based on the second portion is stored in another equipment (method 4); or, a sub-file including the seventh portion obtained based on the fourth portion is stored locally, and a sub-file including the third portion and the eighth portion obtained based on the fourth portion is stored in another equipment (method 5); or, a sub-file including the fourth portion and the seventh portion obtained based on the third portion is stored locally, and a sub-file including the eighth portion obtained based on the third portion is stored in another equipment (method 6).

In the method 1, the sub-file stored locally is a part of the file corresponding to a low-frequency component of the file, and the sub-file stored in another equipment is a part of the file corresponding to a high-frequency component of the file.

For a frequency-domain element of the file, a low-frequency component generally contains major structure information of the contents of the file, and a high-frequency component contains detail information of the contents of the file (except for the major structure information), so that the former (i.e., the low-frequency component) may be called a core portion and the latter may be called an additional portion. The core portion generally occupies a small storage space and contains an information subject, and can be used independently; and, the additional portion contains only information details and cannot be used independently (it is cannot be understood by human beings due to lack of the information subject). The core portion is stored in the local equipment, and the additional portion is stored in another equipment (e.g., a cloud server). Since the content stored in the another equipment does not contain the information subject of the contents, the user's privacy may not be influenced even if this content is leaked. Since the local content already contains the information subject of the contents, the original content can be restored when the local content is merged with the additional portion stored in another equipment; moreover, the core portion can also be used independently and it is equivalent to a low-quality version of the original content. In this method, the security of the file is further improved, and it may be convenient and quick to realize corresponding processing based on the core portion.

In the method 2, the sub-file stored locally is a part of the file corresponding to a high-bit component of the file, and the sub-file stored in another equipment is a part of the file corresponding to a low-bit high-frequency component of the file.

For the data bit feature of the file, the file content corresponding to a high-bit component generally contains information that can be understood by human beings and, generally, can be used independently, so it can be used as a core portion; and, the file content corresponding to a low-bit component generally cannot be understood by human beings and cannot be used independently, so it can be used as an additional portion. Therefore, when each sub-file of the file is obtained by splitting based on the data bit feature of the file, it is possible that a portion including the high-bit component is stored locally and a portion including the low-bit component is stored in another equipment, in order to better ensure the security of the file.

The method 3 is a solution in which the fifth portion and the sixth portion are obtained by further splitting the low-frequency component (i.e., the first portion). In this solution, the file comprises three portions, i.e., a low-frequency high-bit component, a low-frequency low-bit component and a high-frequency component. In this case, the low-frequency high-bit component contains information that can be understood by human beings and can be stored in the local equipment as a core portion; while both the low-frequency low-bit component and the high-frequency component do not contain information that can be understood by human beings and must be used together with the low-frequency high-bit component, so the low-frequency low-bit component and the high-frequency component can be used as an additional portion and stored in another equipment. As shown in FIG. 2a, if F1 denotes the first portion, F2 denotes the second portion, F1B1 denotes the fifth portion obtained by splitting based on F1 and F1B2 denotes the sixth portion, then in this solution, F1B1 is stored locally, and F1B2 and F2 are stored in another equipment.

The method 5 is a solution in which the seventh portion and the eighth portion are obtained by further splitting the high-bit component (i.e., the fourth portion). In this solution, a part of the file corresponding to the high-bit low-frequency component is stored locally, and the high-bit high-frequency component and the low-bit component are stored in another equipment. As shown in FIG. 2b, if B1 denotes the fourth portion, B2 denotes the third portion, B1F1 denotes the seventh portion obtained by splitting based on B1 and B1F2 denotes the eighth portion, then in this solution, B1F1 is stored locally, and B1F2 and B2 are stored in another equipment.

Based on the solution in the method 3 or 5, the separation of the information that can be understood by human beings from the information that cannot be understood by human beings can be realized maximally, and on the premise of protecting the user's privacy, the data that cannot be understood by human beings are split as much as possible so that the core portion is minimized. By the solution, the storage space of the local equipment can be released as much as possible.

The method 4 is a solution in which the fifth portion and the sixth portion are obtained by further splitting the high-frequency component (i.e., the second portion). In this solution, the low-frequency component and the high-frequency high-bit component are stored in the local equipment, and the high-frequency low-bit component is stored in another equipment. As shown in FIG. 2c, if F1 denotes the first portion, F2 denotes the second portion, F2B1 denotes the fifth portion obtained by splitting based on F2 and F2B2 denotes the sixth portion, F1 and F2B1 are stored locally, and F2B2 is stored in another equipment.

The method 6 is a solution in which the seventh portion and the eighth portion are obtained by further splitting the low-bit component (i.e., the third portion). In this solution, a part of the file corresponding to the high-bit component and the low-bit low-frequency component is stored locally, and the low-bit high-frequency component is stored in another equipment. As shown in FIG. 2d, if B1 denotes the fourth portion, B2 denotes the third portion, B2F1 denotes the seventh portion obtained by splitting based on B2 and B2F2 denotes the eighth portion, B1 and B2F1 are stored locally, and B2F2 is stored in another equipment.

When it is necessary to store a part of contents of the file locally as much as possible, based on the solution in the method 4 or 6, the information that is easily understood by human beings can be stored locally as much as possible.

Based on the solution in the method 1 or 2, the file can be split once only, so the operation load is slightly low.

It should be understood that, in the four examples shown in FIGS. 2a, 2b, 2c and 2d, F1 and F2 are merely for schematically indicating the low-frequency component and the high-frequency component and B1 and B2 are merely for schematically indicating the high-bit component and the low-bit component; portions of the file corresponding to F1, F2, B1 and B2 in different figures may be different, for example, F1, F2, B1 and B2 in FIGS. 2a and 2b are different, F1 and F2 in FIGS. 2a and 2c may be the same or different, and B1 and B2 in FIGS. 2a and 2c are different.

As described above, in practical applications, during the splitting based on the frequency-domain feature and the data bit feature of the file, it is possible that the file is first split based on the frequency-domain feature and the split sub-files are then split based on the data bit feature; or, it is also possible that the file is first split based on the data bit feature and the split sub-files are then split based on the frequency-domain feature.

In an optional embodiment of the present disclosure, each sub-file of the file is associated with at least one of the following information: file-related information of the file, equipment-related information of at least one equipment in which the sub-file is stored, and user-related information.

The file-related information can comprise at least one of following information: file type, file size, file tag, file level, file content, file operation information, file quality, and file storage location; and/or the equipment-related information can comprise at least one of the following information: storage space, battery level, network status, and load condition; and/or the user-related information can comprise at least one of the following information:

user attribute information, user behavior related information, user contact information, and user setting information.

For the file-related information, the file type may comprise but be not limited to one of the following types: text file, video file, picture file and audio information. The file tag may be a default tag of the file when stored in an equipment or may be a file tag defined by the user, and may comprise but be not limited to file size, file name, file creation time, etc. The file content may comprise the content of the whole file and/or the content of at least one sub-file of the file, etc. The file operation information may be file creation time, file opening time (e.g., the last opening time), frequency of use, etc. The file quality may be the size, definition and other information of the file. The file storage location may be storage location information of the file in the local equipment or may be storage location information of each sub-file, etc.

The equipment-related information comprises but is not limited to related information of the local equipment and/or another equipment for storing the sub-files. The storage space may be the whole storage space and/or the remaining storage space of the equipment, etc. The network status may be one or more of the following information: network type (e.g., a wireless local network, a mobile network or more), network speed and available flow of the equipment. The load condition may comprise but be not limited to one or more of the following information: memory usage of the equipment, the number of applications installed in the equipment, the number of running applications, etc.

For the user-related information, the user attribute information may be configured according to actual needs, for example, including but not limited to: gender, age, education background, region, marital status, etc., of the user. The user behavior information may include but be not limited to one or more of the following information: schedule, hotel reservation/air ticket/train ticket, chat/SMS text, current location, etc., of the user. The user contact information may be the contacts, contact persons in a recent period of time, and other information of the user. The user setting information may be user's setting information for equipments, setting information for the file, etc.

In practical applications, the size of each sub-file of the file can be determined or adjusted according to one or more of the above information, and the content of each sub-file may correspondingly change with the change in size of each sub-file. Specifically, for an un-split file, a split ratio for each sub-file during the splitting can be determined based on one or more of the file-related information, the equipment-related information and the user-related information; and, for a split sub-file, it can be determined, based on one or more of the above information, whether to adjust a ratio for sub-files of the file corresponding to this sub-file.

In an optional embodiment of the present disclosure, the file processing method can further comprise:

determining a target split ratio for sub-files of a file to be split; and splitting the file to be split according to the target split ratio to obtain sub-files of the file to be split.

The file to be split can be all un-split files and/or split sub-files in a terminal equipment.

In an optional embodiment of the present disclosure, the file to be split can be at least one file determined based on at least one of the following information: file-related information, equipment-related information of at least one equipment in which the file to be split is stored, and user-related information. The specific decryption of the file-related information, the equipment-related information and the user-related information can refer to the above corresponding decryption. For example, the user-related information can comprise at least one of user attribute information, user behavior related information, user contact information and user setting information. The file to be split can be at least one file determined based on at least one piece of information in the user-related information.

In an example, the file to be split may be preset by the user, that is, the file to be split may be determined based on the user setting information. For example, the user presets one or more files to be split or sets related information of a file to be split. For example, the user can set one or more of the storage location, creation time, included content or other related information of a file to be split. The terminal equipment determines a file to be split (i.e., the above file to be split) according to the related information.

In addition, the terminal equipment can also automatically determine a file to be split. In an example, the terminal equipment can determine a file to be split according to the user's historical settings, the equipment-related information or other information. For example, before setting a file to be split, the user generally sets a picture containing a particular character. Therefore, the terminal equipment can automatically determine a picture containing this particular character as a file to be split. For another example, the terminal equipment can automatically determine the number of files to be split according to the storage space, battery level or other information of the equipment. For example, when the storage space is small or the battery level is low, a set number of files at the last creation time can be determined as files to be split.

It should be understood that only several optional methods of determining a file to be split are listed above. In practical applications, the file to be split can be determined by one or more of the above listed methods according to the actual needs and/or different application scenarios, or other methods of determining a file to be split can be used based on at least one of the file-related information, the equipment-related information and the user-related information.

In an optional embodiment of the present disclosure, splitting the file to be split according to the target split ratio can comprise:

splitting the file to be split according to the target split ratio when a set file splitting condition is fulfilled.

The file splitting condition may be a condition determined based on one or more of the file-related information, the equipment-related information and the user-related information, or may be a condition set according to actual application requirements. In an optional implementation, a file to be split can be split according to a user's instruction. For example, the user can select one or more files for splitting at one time, or can split a file automatically. In another optional implementation, a file to be processed by splitting (i.e., a file to be split) can also be automatically split when the equipment is idle. For example, when the terminal equipment is idle, all un-split files in the terminal equipment are split.

As an example, the user takes some videos and pictures by the terminal equipment, and the equipment marks these new files as files to be processed. When the equipment is idle (the load is less than a threshold), the equipment splits the files to be processed; and, when the equipment is idle and a wireless local network (e.g., WIFI) is available, the equipment uploads the split additional portion to the cloud and deletes the local additional portion to release the storage space.

In an optional embodiment of the present disclosure, the file processing method can further comprise:

when the file to be split is a split sub-file and when a difference between the target split ratio and a current split ratio is greater than a set threshold, splitting a file before splitting corresponding to the file to be split according to the target split ratio.

The splitting a file before splitting corresponding to the file to be split according to the target split ratio can be re-splitting a file before splitting corresponding to the file to be split, or can be correspondingly processing at least one sub-file of a file before splitting corresponding to the file to be split, so that a target split ratio for the processed sub-files is equal to the target split ratio.

Specifically, the re-splitting a file before splitting corresponding to the file to be split can be obtaining a file before splitting based on current sub-files of the file before splitting and then re-splitting the file before splitting based on the target split ratio. The correspondingly processing at least one sub-file of a file before splitting corresponding to the file to be split can be re-splitting and merging one or more sub-files among current sub-files of the file before splitting so that a ratio of the re-split and merged sub-files is as close to the target split ratio as possible.

In an example, if the file before splitting corresponding to the file to be split comprises two sub-files, the file to be split is a sub-file stored locally (referred to as a local sub-file) in the two sub-files, and the other sub-file is stored in a cloud server (referred to as a cloud sub-file). When the target split ratio for the local sub-file and the cloud sub-file is different from the current split ratio (in this case, the set threshold can be 0), the file to be split or the sub-file stored in the cloud server can be adjusted. For example, when the target split ratio for the local sub-file and the cloud sub-file is greater than the current split ratio, a part of the file can be downloaded from the cloud server and then merged with the local sub-file, and the part of the file downloaded from the cloud server is deleted from the cloud server so that the ratio for the processed local sub-file and cloud sub-file is equal to the target split ratio; and, when the target split ratio for the local sub-file and the cloud sub-file is less than the current split ratio, the local sub-file can be re-split, the split part of the file is uploaded to the cloud server and then merged with the cloud sub-file, and the corresponding part of the file in the local is deleted so that the ratio for the processed local sub-file and cloud sub-file is equal to the target split ratio.

As described above, if the file to be split is an un-split file, the file to be split can be split according to a predicted target split ratio; and, if the file to be split has been split, according to the target split ratio, a file before splitting corresponding to the file to be split can be re-split or at least one sub-file of the file before splitting can be processed correspondingly.

As described above, each sub-file of the file can be obtained by splitting based on the frequency-domain feature and/or the data bit feature of the file, so during the splitting of the file to be split according to the target splitting ratio, the file to be split can be split based on the frequency-domain feature and/or the data bit feature of the file and according to the target split ratio to obtain corresponding sub-files.

In an optional embodiment of the present disclosure, the file processing method can further comprise:

transmitting at least one split sub-file to at least one another equipment for storage.

It should be understood that, when the file to be split is an un-split file, upon splitting the file to be split, the local equipment needs to transmit at least one split sub-file to another equipment for storage. The another equipment can be one or more of other terminal equipments, servers and cloud servers. After at least one sub-file is transmitted to another equipment, the corresponding sub-file in the local equipment can be deleted to release the storage space of the local equipment and realize the optimization of the equipment. When the file to be split is a split sub-file, as described above, if a file before splitting corresponding to the file to be split is re-split, at least one re-split sub-file is transmitted to another equipment for storage; and, if at least one sub-file of the file before splitting is processed correspondingly, it is possible to transmit a part of at least one sub-file to at least one another equipment for storage, or it is also possible to acquire a part of at least one sub-file from another equipment.

In an optional embodiment of the present disclosure, the determining a target split ratio for sub-files of a file to be split can comprise:

extracting corresponding feature information for at least one of file-related information of a file to be split, equipment-related information of at least one equipment in which a file to be split is stored, and user-related information; and determining a target split ratio for sub-files of a file to be split by a deep learning network based on the extracted feature information.

It is to be noted that, in practical applications, the target split ratio for sub-files can be determined by this method, or can be a set split ratio.

The specific network type of the deep learning network can be determined according to actual needs. By training the deep learning network, the network can output a target split ratio for sub-files when the extracted feature information of the file to be split is input into the deep learning network. In an optional solution, the deep learning network can comprise but be not limited to one or more of a neural network, a multilayer perceptron, a decision tree, a word embedding network, a natural language processing model, etc.

It is to be noted that, when the feature information is feature information corresponding to multiple pieces of information, it is possible that the feature information corresponding to multiple pieces of information is input into a same deep learning network and the neural network outputs a target split ratio; or, it is also possible that the feature information corresponding to multiple pieces of information is preprocessed by one or more deep learning networks and a result of preprocessing is input into a deep learning network trained to output a target split ratio, to obtain a target split ratio.

In an optional embodiment of the present disclosure, if at least one sub-file of the file is stored locally and at least one sub-file is stored in another equipment, the correspondingly processing at least one sub-file of the file can comprise at least one of the following methods:
correspondingly processing at least one sub-file stored locally; and
correspondingly processing at least one sub-file stored in another equipment.

In practical applications, when the core portion of the file is stored locally, only the core portion stored locally can be processed according to the user's operation request. If the core portion of the file is stored in another equipment, a sub-file stored in the another equipment can be processed correspondingly according to the operation request. Of course, it is also possible that both at least one sub-file stored locally and at least one sub-file stored in another equipment are correspondingly processed.

In an optional embodiment of the present disclosure, the correspondingly processing at least one sub-file stored in another equipment can comprise at least one of following methods:
acquiring at least one sub-file of the file from another equipment and correspondingly processing the acquired sub-file;
instructing another equipment to correspondingly process at least one sub-file stored therein; and
acquiring at least two sub-files stored in different equipments and merging the acquired at least two sub-files.

When it is necessary to correspondingly process at least one sub-file stored in another equipment, it is possible to acquire at least one sub-file of the file from another equipment by transmitting a file acquisition request to the another equipment and then correspondingly process the acquired sub-file according to the operation request.

The instructing another equipment to correspondingly process at least one sub-file stored therein can be instructing another equipment to correspondingly process at least one sub-file stored this equipment or instructing another equipment to correspondingly process additional another equipment. For example, a file comprises three sub-files, i.e., a sub-file stored locally, a sub-file stored in a cloud server and a sub-file stored in another terminal equipment. The local equipment can correspondingly process directly the sub-file stored locally. When the local equipment needs to process the sub-file stored in the cloud server, the local equipment can transmit a corresponding operation request to the cloud server, wherein the operation request is used for instructing the cloud server to correspondingly process the sub-file stored therein; or, the local equipment can transmit an instruction to the cloud server, wherein the instruction is used for instructing the cloud server to transmit a corresponding operation instruction to another terminal equipment so that the another terminal equipment performs a corresponding operation to the sub-file stored therein.

It is to be noted that, during the acquisition of at least two sub-files stored in different equipments and the merging of the acquired at least two sub-files, the merging can be merging at least two sub-files, or merging at least two sub-files and correspondingly processing the merged file, or correspondingly processing at least two sub-files and merging the at least two processed sub-files.

During the acquisition of at least two sub-files stored in different equipments, the different equipments can be the local equipment and another equipment except for the local equipment, or can be other different equipments. As an example, for example, a file comprises three sub-files a, b and c, wherein the sub-file a is stored in the local equipment, the sub-file b is stored in a cloud server and the sub-file c is stored in another cloud server. Upon receiving an operation request for the file, the local equipment can correspondingly process the file according to the specific content of the operation request. For example, when the operation request is a browse request, the local equipment can acquire the sub-file b and the sub-file c stored in the two cloud servers and the sub-file a stored locally, respectively, then merge the three sub-files and display the merged file to a user. For another example, when the operation request is an edit request and a browse request, the local equipment can correspondingly edit and merge the acquired three sub-files a, b and c and then display the edited and merged file to the user; or, the local equipment can merge the acquired sub-files a, b and c, then edit the merged file and display the edited file to the user.

Of course, the local equipment needs to correspondingly merge the sub-file a and the sub-file b of the file upon receiving the operation request, the local equipment can acquire part of or all contents of the sub-file b from the cloud server and then merge part of all contents of the sub-file a and the sub-file b. For example, for a video having a duration of 50 s and a size of 200 MB, 20 MB (the core portion) of the video is stored in a terminal equipment, 90 MB is stored in a cloud server A and 90 M is stored in another cloud server B. When the operation request is a browse request (for example, the user opens this file in the terminal equipment), the terminal equipment can immediately load and display the core portion of the file. If the current network is slow, the terminal equipment can calculate, according to the current network speed, file contents of 30 M that can be downloaded from the cloud server. In this case, the terminal equipment can acquire a file of 30 M from one cloud server (e.g., acquiring a file of 30 M from the cloud server A), then merge the acquired file of 30 M with the local core portion and display the merged file to the user.

In an optional embodiment of the present disclosure, the operation request can comprise at least one of the following requests:
browse, edit, delete, transmit and acquire.

When the operation request is a transmit request, it is possible that the local equipment transmits at least one sub-file stored locally to an equipment of the recipient; or, it is also possible that the local equipment transmits, to the recipient, at least one sub-file stored locally and at least one sub-file acquired from another equipment; or, it is also possible that, upon receiving the transmit request, another equipment (e.g., a cloud server) transmit, according to this request, at least one sub-file stored therein to an equipment of the recipient corresponding to this request. The acquire request can comprise a receive request. For example, a terminal receiving the file can receive at least one sub-file from the local equipment and/or another equipment.

In an optional embodiment of the present disclosure, the acquiring at least one sub-file of the file from another equipment can comprise at least one of the following:
  acquiring at least one sub-file of the file from another equipment based on equipment-related information;
  acquiring part of or all contents of at least one sub-file of the file from another equipment; and
  acquiring at least one sub-file of the file from another equipment based on a link feature value corresponding to the file.

In practical applications, based on one or more of the storage space, battery level, network status, load condition and other information of the equipment, it can be determined whether to acquire at least one sub-file from another equipment. For example, when the equipment is in a WIFI network or has sufficient data flow, at least one sub-file can be acquired from another equipment. For another example, when the battery level of the equipment is greater than a battery level threshold, at least one sub-file can be acquired from another equipment.

During the acquisition of at least one sub-file from another equipment, it is possible to acquire part of or all contents of at least one sub-file according to the configuration or actual application requirements. Specifically, whether to acquire part of or all contents can be determined based on one or more of the equipment-related information and/or the file-related information.

For example, as a specific example, the user can open, in the equipment, a video file which has been splitted for storage. In the video having a duration of 60 s and a size of 70 MB, 10 MB in the video is stored in a terminal equipment, and 60 MB is stored in a cloud server. When the user opens this file in the terminal equipment, the terminal equipment can immediately load and display the core portion of this file, with the effect being equivalent to that of a low-definition version of this video. If the network is available (for example, there is WIFI or sufficient surplus data flow and the network speed is high enough), upon displaying the core portion of the file, the terminal equipment can download the additional portion corresponding to the file from the cloud, then merge the additional portion with the core portion to form a complete original file and display the complete original file, so that the user can watch the video at the original definition. If the network status is poor (limited network speed, insufficient data flow, etc.), upon displaying the core portion of the file, the terminal equipment can download part of, but not all of, the additional portion corresponding to the file from the cloud. It is assumed that the current network speed is slow, only 0.5 MB/s. Then, within 60 s, at most 30 MB of contents can be downloaded. Considering that the network speed may be unstable, the cloud server can return 20 MB of contents of the additional portion. Thus, the user can watch a video at a definition of 30 MB (10 MB in local, 20 MB returned by the server) without delay (a very small delay that cannot be sensed by the user).

It can be known that, in the solutions in this embodiment of the present disclosure, it is possible to selectively process only the core portion stored locally and determine whether to acquire the additional portion in another equipment according to the actual application requirements and/or the equipment-related information or more. Since it is possible to correspondingly process the core portion stored locally, by the solution, the dependence on the network connectivity can be reduced and the actual application requirements can be better fulfilled.

In an optional embodiment of the present disclosure, the acquiring at least one sub-file of the file from another equipment based on equipment-related information comprises:
  acquiring at least one sub-file of the file from another equipment when equipment-related information of the local equipment and/or another equipment in which a sub-file is stored fulfills a set processing condition; and
  the equipment-related information comprises at least one of the following: storage space, battery level, network status, load condition.

It should be understood that the processing condition can be configured according to actual needs. For example, the processing condition can be as follows: the network status of the local equipment is a WIFI link and the battery level of the equipment is greater than 50%.

The link feature value corresponding to the file is used for uniquely identifying the file. The actual storage location or Uniform Resource Locator (URL) of at least one sub-file stored in another equipment can be stored in association with the corresponding link feature value. When it is necessary to acquire at least one sub-file from another equipment, a file acquisition request including the link feature value can be transmitted to another equipment, and the another equipment can quickly feed back the corresponding at least one sub-file based on the link feature value in this request.

An equipment (the local equipment or another equipment) can acquire at least one required sub-file at any time according to the link feature value if needed. If sub-files of the file are stored locally and in a cloud server, respectively, when it is necessary to transmit a file to other users, the local equipment can transmit only a portion stored locally and a link feature value corresponding to the file; and, upon receiving the link feature value, other users can acquire a part of the file stored in the cloud from the cloud server if needed, without transmitting an acquire request to the local equipment, and moreover, the time for acquiring the part of the file is not limited.

In addition, since an equipment can automatically acquire the desired sub-file from a cloud server or another equipment based on a link feature value, a user does not need to remember the storage location of each sub-file. Accordingly, the file management burden of the user is reduced, the file management difficulty is greatly lowered for the user, and the inconvenience due to the need of the user to remember the storage location of each file in existing cloud storage or other methods is overcome.

In an optional embodiment of the present disclosure, the link feature value can be associated with at least one of the following: contents of the file, time information, user information and location equipment information.

For example, the link feature value can be obtained based on the content of the core portion of the file. Specifically, it is possible to calculate a Hash value corresponding to the core portion by a Hash algorithm and use the Hash value as a link feature value of the file. In order to avoid the collision of Hash values of different files, it may be possible to obtain the link feature value based on the content of the core portion of the file and a user ID. For example, the link feature value can be obtained by splicing the Hash value corresponding to the core portion with the user ID.

In an optional embodiment of the present disclosure, at least one sub-file stored in another equipment is a sub-file encrypted based on the content of at least one sub-file stored locally. In this optional embodiment, the file processing method can further comprise:

decrypting at least one sub-file stored in another equipment according to contents of at least one sub-file stored locally, and determining whether or not contents of at least one sub-file stored locally change if the decryption is successful.

In practical applications, in some specific cases, the user needs to prove that the recorded content is reliable (the time is true without any modification, and the content is true without any modification). For example, in the event of traffic accidents or other special events, the user needs to record pictures/videos of the site situation, important conversations, etc., and needs to prove the truth and reliability of the pictures, sound records, videos or other files obtained during the accidents or other events. In the content verification solution provided in this embodiment of the present disclosure, at least one sub-file stored in another equipment is encrypted based on the content of at least one sub-file stored locally. In this case, since the encrypted additional portion can be decrypted by only the unmodified core portion, by decrypting at least one sub-file stored in another equipment successfully or not based on the content of at least one sub-file stored locally, it can be proved that whether the core portion stored locally is changed, that is, the core portion stored locally can be verified based on the additional portion stored in another equipment.

In an optional embodiment of the present disclosure, a sub-file that is stored in another equipment and encrypted based on the content of at least one sub-file stored locally can also be stored in association with the timestamp of the another equipment. The timestamp can be the time when the another equipment receives the sub-file. For example, when the another equipment is a cloud server, the timestamp can be a server timestamp when the cloud server receives the decrypted sub-file. Since the timestamp is difficult to alter, the real generation time of the file can be proved.

In practical applications, an option corresponding to the verification function can be configured in the terminal equipment, and this option is set by default to be closable. When the user needs to use this function in a specific case, for example, the user needs to acquire pictures, sound records, videos or other files and needs to use this function for the acquired files, and this function can be activated in various methods such as click/gesture/key combination/speech. A file acquired after the activation of the function is split, and an additional portion is encrypted by the split core portion. The encrypted additional portion is transmitted to an another equipment, for example, a cloud server for storage, and the cloud server sets a timestamp for the encrypted additional portion when storing it.

In order to better understand the solutions in this embodiment of the present disclosure, the file processing method in this embodiment of the present disclosure may be described below with reference to some specific examples.

FIG. 3 shows a schematic structure diagram of a network architecture to which the file processing method in this embodiment of the present disclosure is applied. As shown in FIG. 3, the network architecture can comprise a terminal equipment 100 and a cloud server 200, wherein the terminal equipment 100 is the local equipment and the cloud server 200 is the another equipment. A file in the terminal equipment 100 can be split into at least two sub-files, which are separately stored in the terminal equipment 100 and the cloud server 200.

It should be understood that, in practical applications, the terminal equipment 100 can comprise but be not limited to smartphones, tablet computers, personal computers, wearable devices such as smart watches/smart glasses, smart home devices such as intelligent refrigerators/smart TV sets, smart cars, or more. The cloud server 200 can be a public server provided by a manufacturer and/or a self-designed private server. After a sub-file is manually or automatically uploaded to the cloud, the sub-file can be processed by a webpage/management application (APP) or in other methods.

Based on the system architecture shown in FIG. 3, the file processing method in this embodiment of the present disclosure may be described by the following examples.

FIG. 4 shows a principle diagram of processing and uploading a complete file (i.e., an original file) stored in the terminal equipment 100. It can be known that the complete file can be split into two portions, i.e., a core portion and an additional portion, wherein the core portion is locally stored in the terminal equipment 100 and the additional portion is stored in the cloud (i.e., the cloud server 200).

Figure 5:
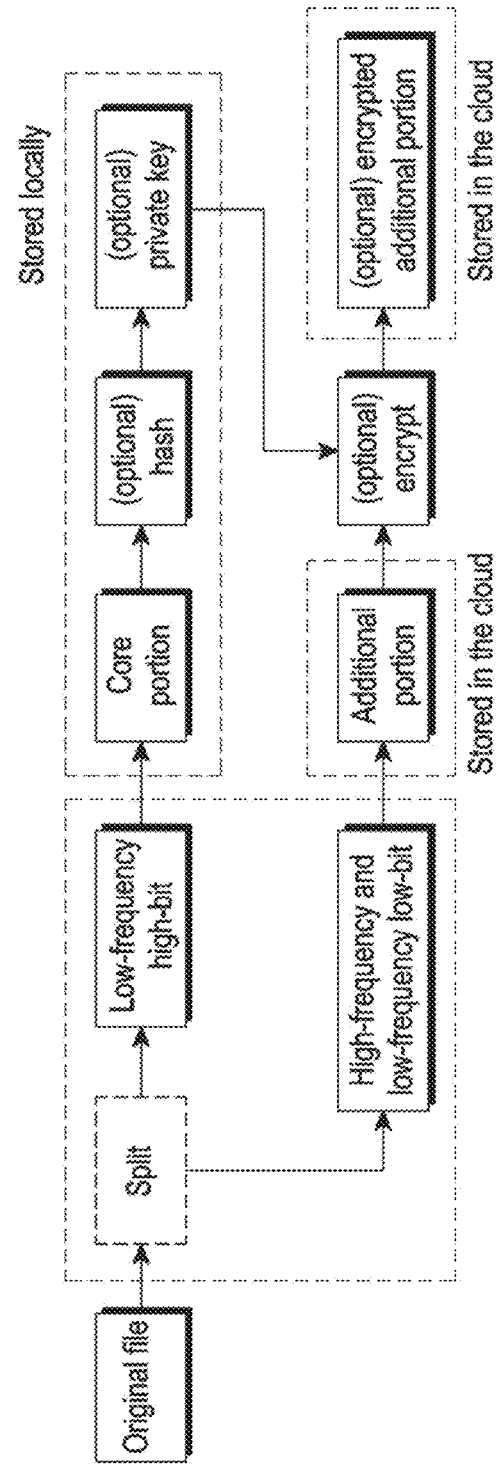
FIG. 5 shows a schematic flowchart of a file processing method according to an example of the present disclosure.

As an example, FIG. 5 shows a principle diagram of splitting an original file to obtain a core portion and an additional portion. It can be know from FIG. 5 that the original file can be split into two portions, i.e., a "low-frequency high-bit" portion and a "high-frequency+low-frequency low-bit" portion, according to the file information content. The former is called a core portion, and the latter is called an additional portion. The core portion contains an information subject, and the additional portion contains only information details. In additional, optionally, as shown in FIG. 5, a Hash value can be generated by the core portion; the Hash value is used as a private key or a private key is generated by the Hash value; and, the additional portion is encrypted by the private key and the encrypted additional portion is stored in the cloud. It should be understood that this operation is not necessary, but the security of privacy can be further improved if this operation is executed.

As an example, FIG. 6 shows a schematic flowchart of splitting a file into a core portion and an additional portion according to a frequency-domain feature and a data bit feature (e.g., a binary data bit feature) of an original multimedia file. In this embodiment, the decryption may be given by taking splitting based on the frequency-domain feature and then based on the data bit feature as example.

As shown in FIG. 6, before splitting, the terminal equipment can determine whether the original multimedia file is in a compressed encoding format; and, the original multimedia file is decompressed into original data if the original multimedia file is in the compressed encoding format. For common multimedia files such as audios/pictures/videos, the original data can be expressed in a one-dimensional/two-dimensional/three-dimensional matrix, which separately represents the temporal distribution of the amplitude of sound/the spatial distribution of the brightness of three primary colors for pixels/the temporal distribution of pictures frame by frame.

During the splitting based on the information frequency (i.e., frequency-domain feature) of the file, the original data is transformed into frequency-domain data. The original data can be transformed into frequency-domain data by Fast Fourier Transform (FFT)/Discrete Cosine Transform (DCT)/Short-Time Fourier Transform (STFT)/Wavelet Transform (WT) or other time/spatial domain-to-frequency domain transform methods. The frequency-domain data is a matrix having the same dimensionality of the original data.

As an example, the frequency-domain data can be expressed as:

$$[[F_{00}, F_{01}, F_{02}, \ldots, F_{0n}],$$
$$[F_{10}, F_{11}, F_{12}, \ldots, F_{1n}]$$
$$\ldots$$
$$[F_{m0}, F_{m1}, F_{m2}, \ldots, F_{mn}]]$$

where each frequency-domain element $F_{ij}$ represents a frequency-domain feature value of the corresponding frequency element, that is, the magnitude/amplitude of a frequency-domain component of the frequency-domain element. Generally, an element with smaller i and j corresponds to a low-frequency component, and an element with larger i and j corresponds to a high-frequency component. The m and n are the height and width of the frequency-domain data matrix. The low-frequency component contains major structure information of the content, and the high-frequency contains detail information of the content (expect for the major structure).

It is to be noted that, in practical applications, during the frequency-domain transformation of the original data, the form of the obtained frequency-domain data matrix may be different due to different frequency-domain transformation methods. The frequency-domain data matrices obtained by some transformation methods may fulfill the condition that an element with smaller i and j corresponds to a low-frequency component and an element with larger i and j corresponds to a high-frequency component; however, the frequency-domain data matrices obtained by some transformation methods may not fulfill this condition. In this example, for ease of decryption, the decryption may be given by taking an element with smaller i and j corresponding to a low-frequency component and an element with larger i and j corresponding to a high-frequency component as example.

In this example, the target split ratio of the file is indicated by a control quantity r1 (having a value range of 0 to 1) and a control quantity r2 (having a value range of 0 to 1), wherein the control quantity r1 controls a ratio for a low-frequency portion to a high-frequency portion, and the control quantity r2 controls a ratio for a high data bit to a low data bit.

Based on the frequency-domain feature and according to the control quantity r1, the frequency-domain data is split into two portions, i.e., a low-frequency component and a high-frequency component. Specifically, if a frequency-domain element with a small subscript corresponds a low-frequency component, all Fij satisfying i<m*r1 and j<n*r1 can be classified into a low-frequency component portion containing low-quality major structure information; and, other Fij can be classified into a high-frequency component portion which cannot be used independently.

As an example, FIG. 6a shows a schematic diagram of a splitting method. As shown in FIG. 6a, $F_{00}$, $F_{01}$, $F_{10}$ and $F_{11}$ are the low-frequency component portion, and the remaining is the high-frequency component portion.

Optionally, after the classification of the low-frequency component portion and the high-frequency component portion, the low-frequency component portion can be further split based on the data bit (i.e., the data bit feature) and according to the control quantity r2. In an example, by taking a binary system as example, each low-frequency element $F_{ij}$ can be expressed a series of binary bits shown in FIG. 6, where q+1 represents the number of binary bits. If a binary bit with a small subscript represents a high data bit, all $Bit_i$ satisfying i<q*r2 can be classified into a low-frequency high-bit component portion, and the remaining $Bit_i$ can be classified into a low-frequency low-bit component portion.

By the two-step splitting, the original data is split into three portions, i.e., a low-frequency high-bit component, a low-frequency low-bit component and a high-frequency component. Only the low-frequency high-bit component contains information that can be understood by human beings and is stored in the local equipment as a core portion; and the low-frequency low-bit component and the high-frequency component do not contain information that can be understood by human beings and must be used together with the low-frequency high-bit component, so the low-frequency low-bit component and the high-frequency component are used as an additional portion and stored in the cloud.

In this example, by the two-step splitting, the separation of the information that can be understood by human beings from the information that cannot be understood by human beings can be realized maximally, and the data that cannot be understood by human beings are split as much as possible so that the core portion is minimized.

It should be understood that, in practical applications, it is also possible to split the original data according to only the frequency-domain feature or the data bit feature. For example, in this example, it is possible that the splitting based on the data bit feature is not performed, and the low-frequency component and the high-frequency component in the result of splitting based on the frequency-domain feature are directly used as a core portion and an additional portion, respectively. The effect of the information separation can also be achieved. If the splitting based on the data bit feature is omitted, the separation effect is inferior to that of the two-step splitting (the core portion obtained by the two-step splitting is smaller), but the operation load is lower.

In this embodiment, during the splitting process, r1 and r2 control a split ratio. Smaller r1 and r2 may produce a low quality but a smaller core portion and a larger additional portion; and, larger r1 and r2 may produce a high quality but a larger core portion and a smaller additional portion. The r1 controls a ratio for the splitting based on the frequency-domain feature. Specifically, the size/complete size of the low-frequency component portion is equal to r1^n_dim, i.e., $r1^{n\_dim}$ (for an audio, n_dim=1; for a picture, n_dim=2; and, for a video, n_dim=3). The r2 controls a ratio for the splitting based on the data bit feature. Specifically, the ratio of the size of the low-frequency high-bit component portion to the size of the low-frequency component portion is equal to r2.

In practical applications, the r1 and r2 can be preset default values. For example, the r1 and r2 are empirically set as 0.1. In addition, it is also possible to set the r1/r2 in real time according to the current equipment status during the initial use. For example, when the current available storage space of the equipment is small, r1 and r2 are set as smaller values; and, when the current available storage space of the equipment is large, r1 and r2 are set as larger values. It is also possible to set the r1/r2 manually by the user, or set the r1/r2 automatically by other modules (as described hereinafter, a target split ratio for each sub-file of a file to be split is determined by a deep learning network according to feature information corresponding to at least one of file-related information of the file to be split, equipment-related information of at least one equipment in which sub-files of the file to be split are stored, and user-related information), or set r1/r2 automatically by other applications/equipment operating systems or more. No manner how the r1/r2 is set, the information in the additional portion cannot be understood by human beings, so that the privacy protection with an extremely high security is realized.

Figure 7:
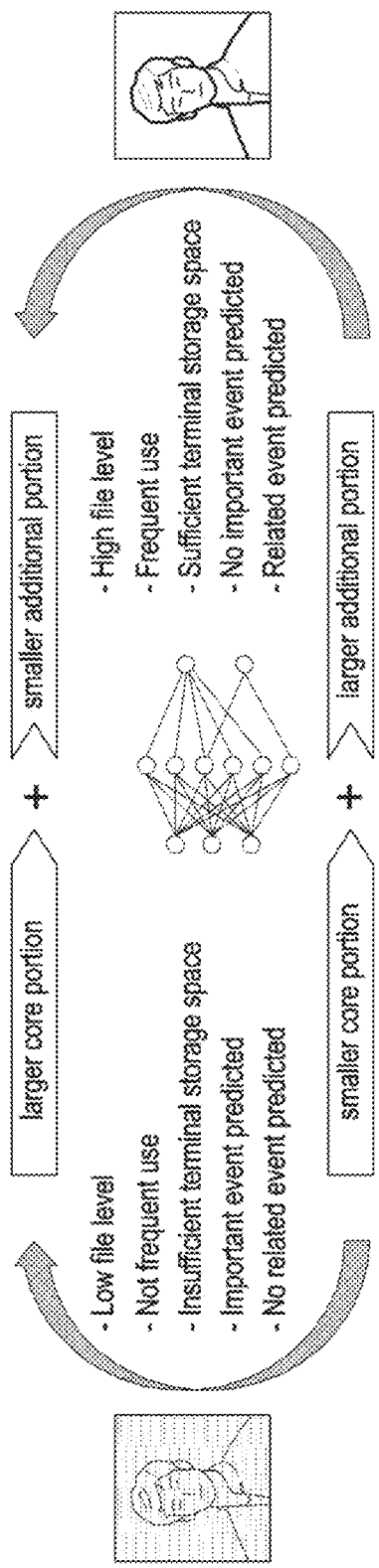
FIG. 7 shows a principle diagram of an automatic storage and management method based on user event prediction according to an example of the present disclosure.

As an example, FIG. 7 shows a principle diagram of an automatic storage and management method based on user event prediction. The idea is as follows: a storage ratio of a file in the local and in another equipment, i.e., a target split ratio for sub-files of the file, is adjusted according to at least one of the file-related information of the file to be split, the equipment-related information of at least one equipment in which sub-files of the file to be split are stored, and the user-related information. The picture in FIG. 7 is used as an example of the file to be split. By the information that can be acquired, such as the level of the file, the usage frequency of the file and the adequacy of the storage space of the terminal equipment shown in FIG. 7, the terminal equipment can analyze and predict an event that the user is going to/planning to carry out in near future, for example, a business travel, a personal travel, a family party, etc. Meanwhile, the terminal equipment can also analyze the properties of each local file by the information that can be acquired, to obtain a correlation/degree of match with a future event. On this basis, it is also possible to obtain a target split ratio for files to be split by considering the remaining storage space of the terminal and then adjust each file.

If a file to be split is an un-split file, the adjustment of the file refers to the determination of a split ratio for a core portion and an additional portion of the file. For a split file, if a difference between the target split ratio and a current split ratio for each sub-file is greater than a set threshold, the adjustment of the file is to, by changing the split ratio for the file, obtain a larger core portion and a smaller additional portion (better quality of the local file and low flow/time overhead for loading the complete file) or a smaller core portion and a larger additional portion (lower quality of the local file and less local storage occupation). By file-by-file adjustment based on the user's events, a sufficient available storage space of the terminal is ensured for the user in various cases, and the files to be used by the user are ensured to be locally stored in the terminal as much as possible. Accordingly, the availability of the files to be used by the user is ensured as far as possible, and the actual needs of the user are better fulfilled.

In FIG. 7, if the file has a low level, the file is rarely used, the terminal is insufficient in storage space, an important event is predicted or no related event is predicted, during the splitting of the file to be split, a smaller core portion and a larger additional portion can be acquired, so that low quality of the sub-file stored locally is realized and the local storage is less. If the file has a high level, the file is used frequently, the terminal is sufficient in storage space, no important event is predicted or a related event is predicted, during the splitting of the file to be split, a larger core portion and a smaller additional portion can be acquired, so that high quality of the sub-file stored locally is realized and the flow/time overhead for loading the complete file is low.

For example, when an important event is predicted, for example, the user is going to travel, the terminal equipment needs a greater storage space since it is very necessary to take pictures or videos during the travel. Thus, during the splitting of the file to be split, the file to be split can be split into a smaller core portion and a larger additional portion, so that a greater storage space is released. For another example, when a related event is predicted, for example, the user may go to a friend's party, it is very likely to use related files such as pictures or videos related to persons participating in this party, the larger core portion of the related files can be stored in the terminal equipment for use by the user.

Figure 8:
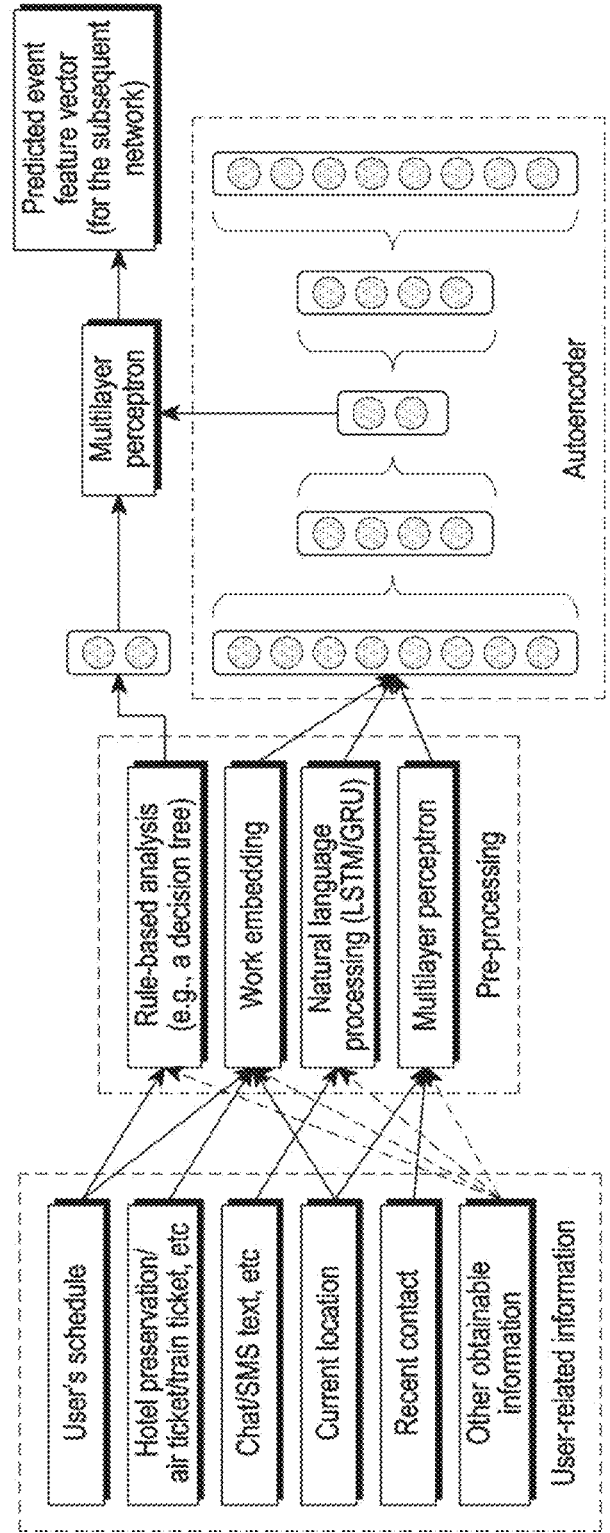
FIG. 8 shows a schematic diagram of a method for extracting feature information based on user-related information according to an example of the present disclosure.

As a specific example, FIG. 8 shows a schematic diagram of a method for extracting corresponding feature information for the user-related information. In this example, various methods can be used to process the user-related information that can be acquired, so as to predict features of events of the user in near future (i.e., feature information corresponding to the user-related information). As shown in FIG. 8, the user-related information that can be acquired comprises but is not limited to: the schedule of the user, hotel preservation/air ticket/train ticket, chat/SMS text, current location, recent contact, etc. In addition to the information that can be directly acquired by the terminal equipment, other information that can be acquired, such as information of other terminal equipments belonging to a same account/a same network/connected to each other, can also be used as an input. The user-related information is preprocessed by various methods. A preprocessor converts multimodal unstructured information into a vector indicating the information features.

Generally, for the structured information (e.g., the schedule, etc.), by rule-based analysis (e.g., a decision tree) or in other processing methods, a deterministic result vector can be generated for subsequent processing. This result has a higher reliability than the outputs from the remaining models, so it can have a higher weight in subsequent use. In a method for realizing a higher weight, this result is directly input into a multilayer perceptron for predicting features of the user's event, rather than input into an autocoder together with other results from the preprocessor.

It is possible to perform work embedding on vocabulary/entity information (e.g., keywords in the current location, hotel preservation/air ticket/train ticket and schedule, etc.), so that the vocabulary/entity information can be converted into a vector for maintaining the original vocabulary/entity information structure for subsequent processing.

Natural language processing such as LSTM (Long Short Term Memory)/GRU (Gated Recurrent Unit) is performed on natural language texture information to generate a vector indicating its key feature (e.g., theme/keyword/user's intention, etc.) for subsequent processing.

For the quantifiable/numerical information (e.g., the recent contact persons/the coordinates of the current location), a vector indicating its properties is generated by a multilayer perceptron for subsequent processing.

The outputs of the word embedding, the natural language processing and the multilayer perceptron in the preprocessor are merged into a vector which is then input into an autocoder, so that the information is compressed and extracted.

The output vector of the rule-based analysis (e.g., a decision tree) and the output vector of the autocoder are input into a multilayer perceptron to obtain a predicted event feature vector. This vector indicates multiple properties of the events in near future predicted by the terminal, including but be not limited to: event type, duration, place, related character, importance, etc. (for example, travel, one week, America, family members, high). This information is input into the subsequent network and can be used for determining how to adjust the split ratio for each file in the terminal.

It should be understood that FIG. 8 merely shows a feasible flow of preprocessing the user-related information in this example. In practical applications, the input data or the connection of the input data to the preprocessor can be changed.

Figure 9:
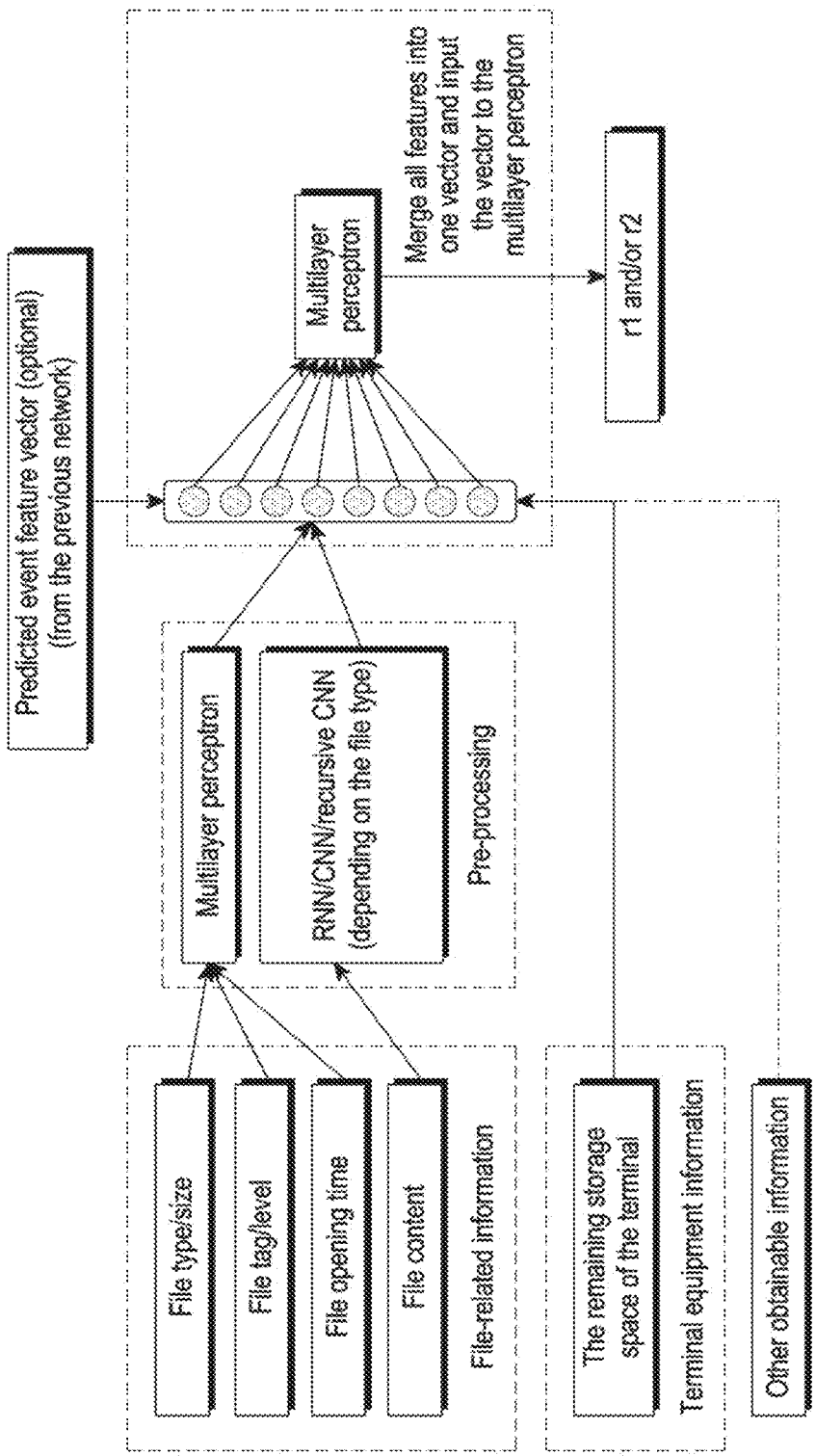
FIG. 9 shows a schematic diagram of a method for determining a target split ratio for a file to be split according to an example of the present disclosure.

As a specific example, FIG. 9 shows a schematic diagram of extracting corresponding feature information according to the file-related information of the file to be split and the terminal-related information and obtaining a target split ratio according to the extracted feature information. In this embodiment, based on the predicted event feature vector, the features of each file and the correlation of each file with the predicted event are analyzed; and then, considering the terminal equipment information such as the remaining storage space of the terminal equipment, it is determined how to adjust each file, that is, a solution for file analysis and automatic adjustment is determined.

In this example, as shown in FIG. 9, the file-related information that can be acquired comprises, but is not limited to: file type/size, tag/level, file opening time, file content or more. The level can be set manually by the user or may be automatically determined by a user's behavior. For example, if the user marks a certain picture with LIKE, or edits and modifies or beautifies a certain picture, or shares a certain picture, or frequently opens a certain picture, etc., it is indicated that this picture has a high level. For a split file, the file content refers to the content of the core portion; while for a un-split file, the file content refers to the full content.

In this example, the file information can be preprocessed by various methods. The preprocessor converts multimodal unstructured information into a vector indicating the information features.

Generally, the information such as file type/size, tag/level and file opening time can be encoded into a vector by a multilayer perceptron for subsequent processing. In this example, the file content can be processed by an RNN (Recurrent Neural Network)/CNN (Convolutional Neural Network)/recurrent CNN. The specific network can be determined according to the file type. For example, the RNN may correspond to audios, the CNN may correspond to images, the recurrent CNN may correspond to videos. The file content is encoded into a vector indicating its feature for subsequent processing.

It should be understood that FIG. 9 merely shows a feasible flow of preprocessing the file-related information in this example. In practical applications, the input data or the connection of the input data to the preprocessor can be changed.

The output from the preprocessor in FIG. 9, the equipment-related information (i.e., terminal equipment information, for example, the remaining storage space of the terminal, etc.), the predicted event feature vector obtained in FIG. 8 and other information that can be acquired may be merged into a vector which is then input into a multilayer perceptron. The multilayer perceptron is trained to output a target split ratio (e.g., target r1 and/or r2) for the current file (i.e., the file to be split) for the predicted event considering the current remaining storage space.

It is to be noted that, in practical applications, the feature prediction of the predicted event of the user shown in FIG. 8, the file analysis and automatic adjustment shown in FIG. 9 and the equipment-related information can also be operated independently. In other words, the target r1 and/or r2 for each file to be split can be obtained by a deep learning network (e.g., a multilayer perceptron) based on only the predicted event feature vector or the feature vector corresponding to the file-related information output from the preprocessor in FIG. 9 or the equipment-related information. Specifically, the multilayer perceptron for outputting the target r1 and/or r2 can be trained to operate in the case of the input being the predicted event feature vector, or operate in the case of the input being the feature vector corresponding to the file-related information, i.e., in the case of the predicted event feature vector being null, or operate in the case of the input being the related information of the terminal equipment. By taking the input being the feature vector corresponding to the file-related information and the remaining storage space of the terminal as example, the multilayer perceptron may operate independently of the user event feature prediction. It is equivalent that the file/storage space is managed by considering only the popularity of each file/user preference and the storage space of the terminal equipment.

After the target split ratio (i.e., the target r1 and/or r2) is obtained, if the file to be split is an un-split file currently, the file to be split can be split according to the predicted target r1 and/or r2, an additional portion is uploaded, and the local additional portion is deleted; and, if the file to be split is a split sub-file and the current split state is not based on the target r1 and/or r2, the file to be split can be adjusted (for example, the file to be split is split again and a portion of the file is updated, or a portion of the file is downloaded and merged), and the adjusted ratio for the core portion to the additional portion is as close to the target split ratio as possible.

In the present disclosure, the feature extraction and the target split ratio prediction shown in FIGS. 8 and 9 can be executed for each file to be split, respectively, to obtain a target split ratio (i.e., r1 and/or r2) for each file to be split. In other words, r1 and/or r2 is output for each file to be split to control the adjustment mode (i.e., splitting mode) of this file to be split.

Each network (e.g., rule-based analysis, word embedding, natural language processing model, multilayer perceptron, autoencoder, RNN, CNN, etc.) show in FIGS. 8 and 9 can be trained in advance, or can be continuously optimized and updated according to the user's behavior in practical applications. For example, under certain environmental conditions, the user can manually adjust a split ratio for a certain file, and this behavior can be used as training data for subsequent network update.

As a specific example, it is assumed that the user is going to travel abroad and the remaining storage space of the terminal is small. By the method shown in FIG. 8, the terminal can predict that the user is going to travel abroad. For this event, a larger storage space should be reserved (the user may take lots of pictures/videos and it may be inconvenient to access to the cloud storage abroad). In addition, for the travel abroad, some leisure music/videos should be prepared for entertainment on the plane/when the user is bored. The terminal can analyze files one by one by the method shown in FIG. 9. If a file is not relevant, this file may be uploaded to the cloud to ensure the local storage space. If a file is a favorite song of the user or a new movie conforming the user's preference, the file may be moved to the local so that the user can play it conveniently on the plane.

As another specific example, it is assumed that the user may go to a friend's party and the remaining storage space of the terminal is sufficient. By the method shown in FIG. 8, the terminal predicts the party to which the user may go and related persons. For this event, a proper storage space should be reserved, and pictures/videos of the related persons should be prepared. The terminal analyzes files one by one by the method shown in FIG. 9. Since the storage space is sufficient, it is unnecessary to adjust irrelevant files. If a file is relevant (for example, a picture/video containing party participants, music suitable for this party, an interesting video clip that can activate the atmosphere, or more), the file is moved to the local so that the user can conveniently use it in the party.

After the local original file is split, the terminal equipment can upload the split additional portion to the cloud when the WIFI is available and/or the equipment is idle, and delete the local additional portion to release the storage space.

When it is necessary to operate a file, the file needs to be optimized, deleted/edited, etc. As an implementation, when the user needs to delete a file, the terminal equipment receiving an instruction transmits a request to a cloud server and deletes the core portion stored in the terminal equipment, and the cloud server removes the additional portion stored in the cloud server according to the received request.

When the user edits a file, the terminal equipment can acquire the additional portion from the cloud server and obtain a complete file by merging the additional portion with the core portion. The edited file is regarded as a new file which is then split, uploaded or processed. As another possible synchronous editing method, the user edits the core portion in the terminal equipment, the terminal equipment uploads the corresponding modified content or editing step to the cloud server, and the cloud server correspondingly edits the additional portion to achieve the same effect according to the modified content or editing step for the core portion.

Figure 10:
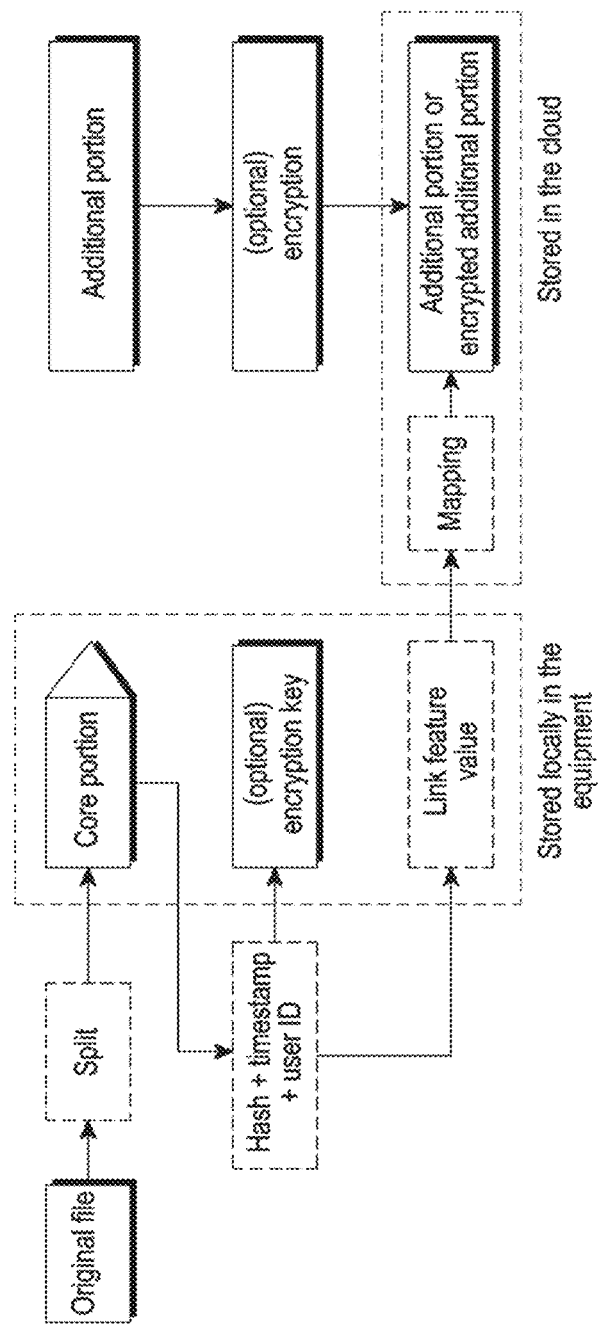
FIG. 10 shows a schematic diagram of a file processing method according to an example of the present disclosure.

As an example, FIG. 10 shows a flowchart of a method for realizing the automatic link of the core portion and the additional portion based on a link feature value. FIG. 11 shows a schematic diagram of a method for generating a link feature value and obtaining an original file based on the link feature value. A unique link feature value is calculated by the content of the core portion, and a mapping table (or a correspondence in other forms) is maintained in the cloud to record the storage location of the additional portion corresponding to each link feature value.

As shown in FIGS. 10 and 11, after the original file (e.g., a picture, an audio or a video, etc.) is split into a core portion and an additional portion, the terminal equipment can calculate a Hash value (which can also be referred to as a file Hash value) corresponding to the core portion by MD5 (Message digest algorithm v5)/SMA (Secure Hash Algorithm) or other Hash algorithms. By the properties of the Hash algorithm, it is ensured that Hash values of different files are different, except in extremely rare cases. That is, a corresponding file can be uniquely determined by a Hash value. In addition to the above Hash algorithms, other algorithms can also be used to generate a unique link feature value corresponding to the file.

In rare cases, two different files may generate a same Hash value. This is called a collision. In order to deal with this situation, the terminal equipment can add a timestamp and/or a User ID (UID) and/or equipment-related information (e.g., an equipment ID, etc.) in the Hash value. This is an optional step. The timestamp may be a file creation time or a time when the splitting occurs. In an optional method, the file Hash value, the timestamp and the UID can be directly spliced together, and this result is unique and called a link feature value. Different files have different link feature values. The link feature value is locally stored in the terminal equipment. It is also possible to generate a link feature value by [file Hash value+timestamp], [file Hash value+UID] or in other manners; or, it is also possible to generate a unique value as a link feature value by [file Hash value+timestamp and/or UID] or in other manners through other algorithms.

In addition, as shown in FIG. 10, optionally, similar to the process of generating the link feature value, another Hash value can be obtained by another Hash algorithm or a same Hash algorithm with different parameters. The Hash value itself, or the Hash value and the timestamp and/or the UID, can be used as an encryption key for encrypting/decrypting the additional portion in the cloud.

For all files to be processed, i.e., files to be split, after the terminal equipment splits each file to obtain a core portion and an additional portion, a link feature value corresponding to each file to be split can be determined by the above method.

When the equipment is idle, the WIFI is available or the network traffic is sufficient, the equipment uploads the additional portion of the file to the cloud, and the cloud server updates the mapping table. The mapping table maintains the correspondence between the link feature value and the storage location information of the additional portion. For example, a record of [link feature value actual storage location/URL of the corresponding additional portion] is added in the table. The actual storage location of the additional portion in the cloud can be changed if needed. During the adjustment of the actual storage location of the additional portion, the cloud server updates the mapping map, and updates the actual storage location or URL corresponding to the link feature value to an adjusted value. Therefore, it is ensured that the actual storage location of the additional portion can always be found by the link feature value and the mapping table. The additional portion stored in the cloud can be an additional portion encrypted by the encryption key.

When the user needs to perform an operation to a split file in the terminal equipment, as shown in FIG. 12, for example, when it is necessary to click/open the split and uploaded file in the terminal, the terminal equipment can immediately display the core portion of the file. If the network status is allowed, for example, if the WIFI is available or the surplus traffic is sufficient, the terminal equipment can upload the link feature value corresponding to the file to a cloud server, and the cloud server acquires the actual storage location/URL of the additional portion of the file by retrieving the mapping table so as to obtain the additional portion of the file and then returns the additional portion of the file to the terminal equipment. After the terminal equipment has received the additional portion of the file and if the additional portion is encrypted, the equipment may decrypt the additional portion (it is possible that the additional portion is decrypted by the cloud and then transmitted to the equipment, or it is also possible that the additional portion is received and then decrypted by the equipment), and the terminal equipment merges the core portion with the additional portion/the decrypted additional portion to obtain a complete original file and displays the complete original file, as shown in FIG. 11. In FIG. 11, the equipment is a terminal equipment, and the cloud is a cloud server.

If the network status is medium (the network speed is limited or the surplus traffic is not very sufficient), the cloud server can also return a part of the additional portion, rather than the complete additional portion. The terminal equipment merges this part of the additional portion with the core portion to generate a file having a medium quality and then displays the file. The specific ratio of the returned additional portion can be determined by the network status and the file content. In practical applications, without resulting in an obvious delay/in a reasonable and appropriate traffic range, the additional portion can be downloaded as much as possible to improve the quality of the displayed file as high as possible.

Figure 13:
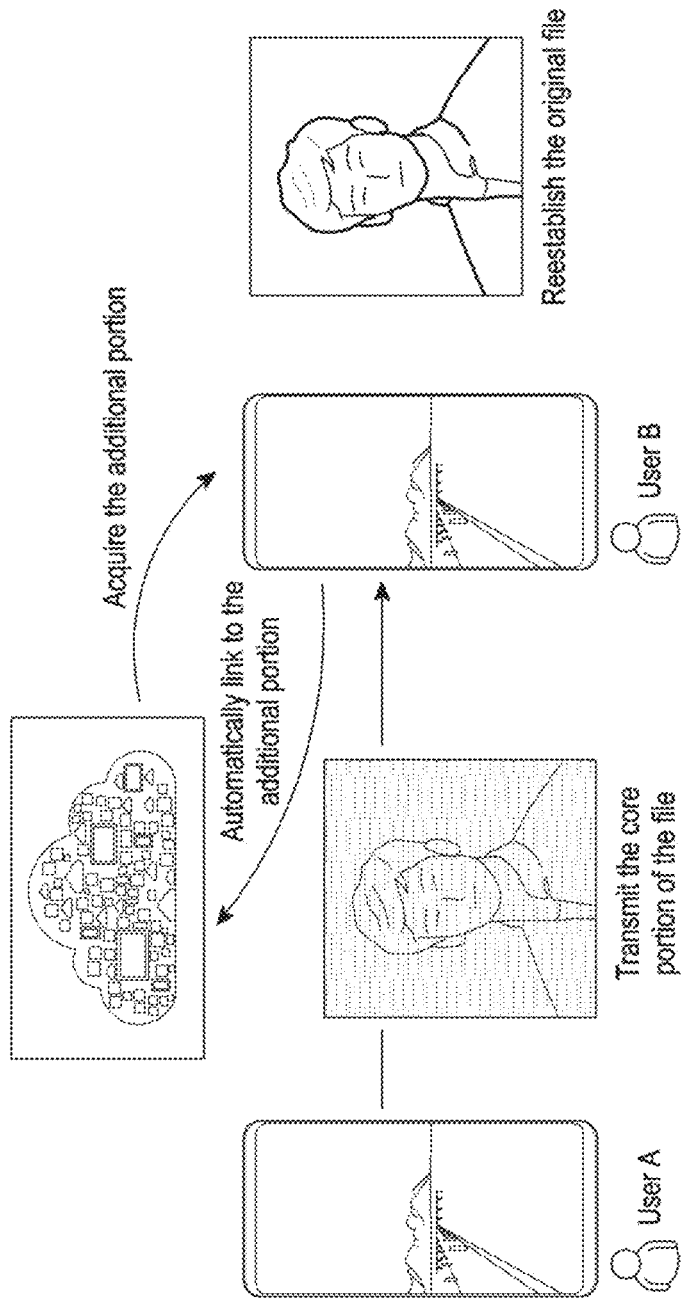
FIG. 13 shows a principle diagram of a file transmitting method according to an example of the present disclosure.

As an example, FIG. 13 shows a principle diagram of a simple and traffic-saving file sharing method, wherein a sender transmits a core portion of a file, and the recipient can directly preview its content and download the additional portion, if necessary, to obtain a complete file. As shown in FIG. 3, a user A transmits a file to a user B, and the user A locally stores the core portion of this file. The user A transmits the core portion to the user B, and may also transmit a link feature value to the user B. Upon receiving the core portion transmitted by the user A, the user B can directly preview the content of the core portion, and can automatically acquire an additional portion if necessary according to the link feature value and then merge the additional portion with the core portion to obtain an original file, i.e., reestablish the original file.

As an example, FIG. 14a shows a schematic flowchart of a file sharing method. Based on this method, the user A can transmit a compressed file to another user. When the terminal of the transmitting user receives, from the user A, an instruction of transmitting a file to the receiving user B through an application (app), for example, an instruction of "transmitting a file to the user B" from the user A, and if the user A does not indicate to transmit a complete/original file, it is possible to transmit a compressed file by default according to the current app management.

Specifically, the terminal equipment of the user may compare the quality of the core portion of the file with the default quality of the app. By taking sharing a picture by a certain communication application as example, this application is defaulted to compress a too large picture to about 100 kB. It can be considered that the default size of the picture shared by the application is 100 kB.

If the quality of the core portion is higher than the default quality of the app, the core portion is compressed to the default quality of the app and then transmitted to the receiving user. If the quality of the core portion is less than the default quality of the app (the local core portion is too small and too low in quality), it is possible to directly transmit the core portion, or it is also possible that a part of the additional portion is acquired from the cloud by the link feature value corresponding to the core portion and then merge the core portion with this part of the additional portion to obtain a file having a quality equivalent to the default quality of the app, wherein the ratio of the additional portion to be acquired from the cloud can be determined according to the default quality of the app. After the merged file is obtained, it is possible to directly transmit the merged file, or it is also possible to randomly flip over some bits of the merged file (in order to protect the information of the core portion) and then transmit the merged file to the receiving user. In this method, the receiving user B can receive a small-size/low-quality file. If the transmitting user wants to transmit the complete file to the receiving user subsequently, upon receiving an instruction transmitted to the user B by the user A, the terminal of the transmitting user can transmit a link feature value of this file to the receiving user; and, the receiving user can automatically acquire an additional portion from the cloud by the link feature value, and merge the additional portion with the core portion to obtain the original file.

It should be understood that, when the merged file is transmitted after some bits are randomly flipped over, the receiving user still can use this file, that is, the flipped-over file may not influence the use of the receiving user. For example, when the file is a picture, the content in this picture still can be viewed. By the flipping-over, the receiver can be prevented from obtaining the original file based on the received file. In this method, the transmitting user can realize the control on the access to the transmitted file.

Compared with the existing methods, the transmitting user does not need to perform any additional operation. When the quality of the core portion is higher than the default quality of the app, the traffic required for the transmitting action is the same as that in the existing methods; and, when the quality of the core portion is lower than the default quality of the app, the traffic required for the transmitting action is less than that in the existing methods if the core portion is transmitted directly. In this method, the experience of the receiving user is also improved, and the receiving user can receive the complete file without waiting for a long period of time and can quickly receive and browse the core portion.

FIG. 14b shows a schematic flowchart of another file sharing method. Based on this method, when the terminal of the transmitting user receives an instruction of transmitting a file from the user A to the receiving user B and the transmitting user indicates to transmit a complete/original file, for example, an instruction of "transmitting a complete/original file to the user B" from the user A is received, the terminal transmits the core portion, a corresponding encryption key (if the additional portion is encrypted) and a link feature value to the receiving user. Based on the received core portion, the receiving user can directly preview the core portion and acquire information about this file. The receiving user can randomly acquire the corresponding complete additional portion from the cloud by the link feature value corresponding to the corresponding portion, and then merge the additional portion with the core portion to obtain the complete/original file. If the additional portion is encrypted, the additional portion can be first decrypted by the decryption key and then merged with the core portion to obtain the complete/original file.

Based on this method, when the transmitting user needs to transmit a complete/original file to the receiving user, the transmitting user transmits the core portion of the file, a link feature value or other information to the receiving user. The receiving user receives a small-size/low-quality file and can randomly acquire the complete/original file, that is, the receiving user can obtain the complete file based on the received information. Compared with the existing method for directly transmitting a complete file to a receiving user, the traffic required for the transmitting action is greatly reduced in comparison to the existing method (only the core portion is to be transmitted). In this method, the experience of the receiving user is also improved, and the receiving user can receive the complete file without waiting for a long period of time and can quickly receive and browse the core portion.

As an example, FIG. 15 shows a principle flowchart of a file content verification method. As shown in FIG. 15, a local equipment splits a file into a core portion and an additional portion. For the additional portion, the additional portion can be encrypted based on the content of the core portion and then uploaded to the cloud (in this example, another equipment is a cloud server), and the content of the encrypted additional portion can be used for verifying whether the content of the local core portion is changed.

As a specific example, FIG. 16 shows a schematic flowchart of a method for processing a file to be verified for authenticity. The file to be verified may be a picture, an audio, a video, etc. As shown in FIG. 16, the file content is split into a large core portion and a very small additional portion in real time, and the additional portion is uploaded to the cloud in real time. The additional portion in the cloud can be used for verifying the authenticity of the content of the local core portion. During the generation of a file, the file is split based on a frequency-domain feature and/or a data bit feature of the file. Specifically, for a reading file, since the reading is continuous in time, with the generation of the file, the terminal equipment can slice the file according to a time sliding window and process each slice in real time. For a video file, the file can be processed frame by frame with the generation of the file. Of course, it is also possible to set a time sliding window and then process image frames in a certain period of time corresponding to the time sliding window each time; or, it is also possible to set the number of frames to be processed each time and then process a fixed number of image frames each time. For pictures, each picture can be processed directly.

The terminal equipment can split each slice/each picture based on the frequency-domain feature and/or the data bit feature. The specific meaning of the matrix of frequency-domain elements and the data bit shown in this figure can refer to the above description of the example of splitting a file to be split to sub-files. In FIG. 16, it is possible that a low-frequency high-bit component portion obtained by splitting the file is used as a core portion and a high-frequency portion and a low-frequency low-bit component portion obtained by splitting are used as an additional portion.

In an optional implementation, in this example, during the splitting operation, both the control quantity r1 and the control quantity r2 in the target split ratio may be set to be close to 1. By this target split ratio, the major content of the file can be classified into the core portion. Since the terminal equipment locally stores the information content (i.e., original content) that is almost equivalent to the original record, the security of the file can be ensured to the largest extent. Meanwhile, since the additional portion is very small (very small high-frequency component portion and low-frequency low-bit component portion), when a sub-file corresponding to the split additional portion is uploaded to another equipment (the cloud server shown in this figure), too high traffic overhead may not be caused during the whole process.

During the splitting according to the frequency component (i.e., based on the frequency-domain feature), since the r1 is very close to 1, majority of the file content may be classified into the low-frequency component portion, just a very small part of the file content may be classified into the high-frequency component portion. During the further processing of the low-frequency component portion, since the r2 is very close to 1, majority of the data bits may be classified into the low-frequency high-bit component portion, just a very small part of the data bits may be classified into the low-frequency low-bit component portion.

At the end of classification, a Hash value can be calculated by the low-frequency high-bit component portion (the core portion), and the high-frequency portion and the low-frequency low-bit component portion (the additional portion) are encrypted by this Hash value. The encrypted high-frequency portion and low-frequency low-bit component portion (the encrypted additional portion) are uploaded to the cloud and added with a timestamp.

For the audio and video, the above process may be processed in real time during the file generation; while for photos (i.e., pictures), the above process may be processed immediately after the photos are taken.

By the characteristics of the Hash algorithm and the encryption algorithm, it is ensured that the encrypted additional portion can be decrypted by only the unmodified core portion. In other words, when the additional portion is decrypted successfully, it can be proved that the local core portion is not modified, i.e., not tampered. Meanwhile, since the additional portion in the cloud carries a server timestamp and this information is difficult to be tampered, the real generation time of the file can be proved.

In practical applications, in scenarios such as IoT (Internet of Things), it becomes more common to require multiple equipments to work together with the popularity of various smart home concepts. In many cases, the content of a same file may be used by multiple equipments. For example, a user may often transmit an instruction by an IoT equipment, "to display the video of the last party on the smart TV set", "to play the song recorded yesterday on the smart sound box", etc. If a copy is stored on each equipment that may use this file, the storage space may be wasted greatly. However, if all equipments acquire the file content from the same cloud storage, the file loading speed may be greatly reduced, and the risk of privacy leakage may be caused.

The core idea of the multi-equipment collaboration method provided in this example is as follows: intelligent terminals of a same user/a same system may separately store the core portion of the desired file, the additional portion of the file may be stored in a cloud server, and the intelligent terminal equipments acquire the additional portion from the cloud if needed. Therefore, each equipment in scenarios such as IoT can store data efficiently and safely, and can quickly use the data (the core portion may be displayed when the additional portion is downloaded from the cloud).

FIG. 17 shows a schematic flowchart of a multi-apparatus collaboration method in a specific example. As shown in FIG. 17, a user transmits an instruction by voice (e.g., a voice instruction of "playing photos/videos of the last travel on the TV"), and an equipment receiving this voice instruction understands the intention of this instruction (including action, target content, target equipment, etc.) by ASR (Automatic Speech Recognition) and NLU (Natural Language Understanding). Of course, the user may transmit an equivalent instruction in other methods.

Upon receiving the processed instruction, the target equipment detects whether the core portion of the target content is contained therein. If the core portion of the target content is contained in the target equipment, the target equipment displays the core portion immediately and acquires the additional portion from the cloud. If the additional portion is encrypted, the additional portion may be decrypted and then merged with the core portion to obtain the complete/original file for displaying. If the core portion of the target content is not contained in the target equipment, the target equipment searches it in all related equipments, in order to search the core portion of the target content in the related equipments. The related equipments comprise, but are not limited to: equipments registered with the same user ID, equipments within the same WIFI, interconnected equipments, etc. If the core portion is found in the related equipments, the target equipment acquires the core portion from the related equipments, stores the core portion and immediately displays the core portion; meanwhile, the target equipment acquires the additional portion from the cloud. If the additional portion is encrypted, the target equipment may decrypt the additional portion and then merge the additional portion with the core portion to obtain the complete/original file for displaying.

If the core portion is not found in the related equipments, the target equipment may prompt the user that no corresponding content is found.

For an IoT/multi-equipment collaboration environment, the delete/edit or other operations to the file can be further optimized. As an implementation, a series of backlinks are maintained in a mapping table in the cloud. The backlinks are directed to the core portion of the same file stored in all local intelligent terminals of a same user/a same system. For each file, when the additional portion is uploaded for the first time, a backlink directed to the core portion is established in the cloud; and, when this core portion is transferred to another equipment, the cloud server is informed of adding a corresponding backlink. By the backlinks, all local core portions of the same file in the system can be found.

When the user deletes a file, the user may delete the file stored in only the local terminal equipment or delete the file stored in some or all terminals. In the case of deleting the file stored in only the local terminal equipment, a terminal equipment receiving an instruction transmits a request to the cloud server to remove a backlink directed to the terminal equipment, and deletes the core portion stored in the terminal equipment; and, in the case of deleting the file stored in some or all terminals, a terminal receiving an instruction transmits a request to the cloud server, the cloud server transmits a delete instruction to some or all selected terminals according to the backlinks, the corresponding some or all terminals delete the local core portion of this file, and the cloud server removes the corresponding backlinks. If all terminals delete the local portion/the number of backlinks in the cloud server is 0, the cloud server can remove the additional portion stored in the cloud server.

When the user edits a file, the user may edit the file stored in only the local terminal or synchronously edit the file stored in multiple equipments. In the former case, the terminal acquires the additional portion from the cloud server and obtains a complete file by merging the additional portion with the core portion. The edited file is regarded as a new file which is then split, uploaded or processed.

In the latter case (synchronous edition), the terminal can acquire the additional portion and the backlink from the cloud server and obtain a complete file by locally merging the additional portion with the core portion. After this file is edited by the user, the terminal splits the file and uploads the additional portion to update the additional portion stored in the cloud server, and the cloud server transmits the updated core portion to another equipment according to the acquired corresponding backlink so as to update the core portion in the another equipment.

As another possible synchronous editing method, the user edits the core portion locally stored in the terminal, the terminal uploads the modified content/editing step to the cloud server, and the cloud server correspondingly edits the corresponding additional portion to achieve the same effect according to the modified content/editing step of the core portion and then transmits the corresponding modified content/editing step to another equipment according to the corresponding backlink so that the another equipment updates the core portion in the another equipment.

In the related art, by the solution of storing a file by a cloud server, it is convenient for a user to upload a file in a terminal equipment to the cloud so as to release the storage space of the equipment; and, when there is network connection available, the user can access to/download the file content at any time.

However, the existing file storage solution has the following problems.

1) In the related art, the security of the private content in the file stored in the cloud server cannot be ensured.

There are various probabilities for leaking the user file content stored in the cloud server, so the privacy of the user is seriously threatened.

2) The current storage of files in the cloud highly depends on the network, so it is inconvenient for the user.

When a file of the user is stored in only the cloud and when the network connection is limited/unavailable (for example, the user is in scenarios without any available network connection such as on the plane/high-speed train, or the terminal equipment of the user is insufficient in mobile network traffic/the traffic fee is high, or more), the user cannot normally access to the file content.

3) The current storage of files in the cloud may cause additional management burden for the user, so it is tedious in use.

If the user has lots of files, the user needs to remember the storage location (local/cloud storage service A/cloud storage service B, etc.) of each file, so it is very tedious in use.

4) The user needs to manually manage the files in the local/cloud, so it is tedious in use.

In some cases, for use in the case of no network connection, the user needs to download file content to be used in advance, or the user needs to manually upload part of files to release the storage space.

For example, if the user wants to watch a certain video on the plane and this video is stored in only the cloud, the user needs to download this file in advance, and the user cannot watch this video if the user forgets to download the video.

For example, if the terminal equipment is insufficient in storage space and the user is going to travel abroad, the user needs to manually select and upload part of files to ensure a sufficient storage space for photos/videos to be taken in the travel. If the user forgets to do this, the user may have an insufficient storage space in the travel.

5) The current cloud storage technology can only be used as storage extension, without any content verification function.

In a particular case, the user may want to verify whether the content recorded in the terminal is true and not modified. For example, after a traffic accident occurs, for photos/videos recording the current situation or records of important conversations or more, their verification cannot be fulfilled by the current cloud storage technology.

6) Based on the current cloud storage technology, the user's file sharing operation is complicated or requires heavy traffic.

When the user wants to share a file stored in the cloud, the user needs to open the corresponding management webpage/app to acquire a URL or sharing code corresponding to the file and then transmits it to a target user. The user intended to receive this file can acquire the file content only after executing a subsequent operation.

When the user wants to share a local file, the user needs to transmit the entire file to a user intended to receive this file. If the user uses a mobile network, heavy traffic may be consumed.

7) The current cloud storage technology is not applied to a multi-equipment collaboration scenario.

In an IoT scenario, if a copy is stored on each equipment that may use this file, the storage space may be wasted greatly. However, if all equipments acquire the file content from the same cloud storage, the file loading speed may be greatly reduced, and the risk of privacy leakage may be caused.

In conclusion, with the rapid growth of digital file contents and the limited equipment storage space, there are various problems such as privacy leakage, network dependence and complicated file management. As a result, it is difficult for the user to safely and simply store and use lots of files, and it is very inconvenient for the user to use a terminal equipment.

In views of the problems in the related art, the present disclosure provides a cloud storage solution with high security, low network dependence, and simple and flexible management, which greatly improves the security of the cloud storage, reduces the dependence of the cloud storage on the network connection, avoids additional complicated user operations caused by the cloud storage, greatly reduces the user's troublesome of the limited storage of a terminal equipment, increases other conveniences such as automatic management of files/storage space in terminals, allows the user to share files at saved traffic without any additional operation, and improves the storage efficiency and security in a multi-equipment collaboration scenario. Specifically:

1) considering the security of private contents in the current storage of files in the cloud and the high network dependency in the current storage of files in the cloud, the present disclosure provides a cloud storage method based on file content splitting. The core idea is that a file is split to at least two portions, for example, a core portion containing only a content information subject and an additional portion containing only content information details. The portions (i.e., sub-files) of the file are separately stored in at least two equipments. For example, the core portion is stored locally, and the additional portion is stored in a cloud server. In this method, the content stored in the cloud does not contain the content information subject. Even if a leakage occurs, the privacy of the user may not be influenced. The content stored locally contains the content information subject. The original content can be obtained by merging the core portion and the additional portion stored in the cloud. The core portion can also be used independently, equivalent to the low-quality version of the original content.

With this solution, high security of the privacy can be achieved. Meanwhile, the file content is allowed to be used without any network connection. The storage capacity of the user equipment is greatly increased, and it is more convenient for the user to use the file.

2) considering the additional management burden and tedious operation caused by the current cloud storage for user, the present disclosure provides a method for automatically linking the core portion and the additional portion. The core idea is that a unique feature value (called a link feature value) is calculated for the core portion of the content, a mapping table is maintained in the cloud, and the storage location of the additional portion corresponding to each link feature value is recorded.

In this method, the user can use the core portion stored locally by a uniform interface, and the user can use all contents in the cloud in a same method that he/she use the file stored locally. This greatly reduces the file management difficulty of the user. The terminal equipment can automatically find the additional portion stored in the cloud, and download part or the entirety of the additional portion according to the network condition. This greatly simplifies the user's operation.

3) considering that the user needs to manually manage the file stored locally/in the cloud in which it is tedious in use, the present disclosure provides an automatic storage and management method based on user event prediction. The core idea is: an event that the user is going to/planning to carry out is predicted, and the ratio of storage in local/in the cloud for each file is automatically adjusted based on the event characteristic, the storage space in local and the characteristic pf each files. In this method, a sufficient available storage space is always ensured for the user. Moreover, the storage of files to be used by the user in the terminal equipment ensures the availability of the files to be used by the user, so that the user can obtain better file management experience without any additional burden.

4) considering that the current cloud storage can only be used as storage extension, without any content verification function, the present disclosure provides a content verification method based on split secure cloud. The core idea is that the file content is split in real time to a large core portion and a very small additional portion, and the additional portion is uploaded to the cloud in real time. The additional portion stored in the cloud can be used for verifying the core portion. In this method, content verification with very low network loads is realized so that the content verification requirement from the user is fulfilled.

5) considering that the user's file sharing operation is complicated or requires heavy traffic in the current cloud storage, the present disclosure provides a simple and traffic-saving file sharing method. The core idea is that a sender transmits a core portion of a file and a recipient can directly preview its content and download the complete file if necessary, so that the sender and the recipient can realize traffic-saving file sharing without additional operations. In this method, the operations of the sender and the recipient are simplified, and the traffic consumption of both is saved.

6) considering that the current cloud storage technology is not applied to a multi-equipment collaboration scenario, the present disclosure provides a multi-equipment collaboration method based on split secure cloud. The core idea is that terminal equipments of a same user/a same system separately store the core portion of the desired file and acquire the additional portion from the cloud if necessary. This takes all the storage efficiency, the response speed and the privacy security into consideration.

In addition, in the related art, if a user wants to transmit a file to a recipient, the file is to be transmitted over a fixed dedicated webpage/software/app; the transmission of an original file may consume heavy data traffic of both parties and the transmission efficiency is low; the cloud server corresponding to the app needs to save a copy of the original file, this produces additional server burden; the file may have timeliness, and the original file stored in the cloud server may be expired if the recipient fails to download the original file in time; and the recipient has to receive the entire file in the same interface at one time.

In the technical solutions of the present disclosure, sub-files obtained by splitting a file can be transmitted in various methods, and the user receiving the file can store the sub-files locally and then can freely download other sub-files without using any dedicated webpage/software/app and merge them to obtain the complete file; when a sender transmits a complete file to the recipient, this transmission operation may consume the traffic for transmitting the sub-files instead of the traffic for transmitting the complete file; the cloud server only needs to save the additional portion of the file, so that the server has low burden; the recipient can download the additional portion from the cloud at any time according to the link feature value, without considering the expiration; the recipient can receive the core portion first and then acquire the additional portion, without the need to receive the entire file in the same interface at one time.

Based on the same principle as the file processing method shown in FIG. 1, an embodiment of the present disclosure further provides a file processing device. As shown in FIG. 18, the file processing device 110 can comprise an operation request receiver 111 and a file processor 112.

The operation request receiver 111 is configured to receive an operation request for a file, the file comprising at least two sub-files separately stored in at least two apparatuses.

The file processor 112 is configured to correspondingly process at least one sub-file of the file according to the operation request.

It should be understood that the modules of the file processing device in this embodiment of the present invention can have functions of implementing the corresponding steps in the file processing method provided in the embodiments of the present disclosure. The functions can be implemented by hardware, or can be implemented by executing corresponding software through hardware. The modules can be software and/or hardware, and the modules can be implemented independently or implemented by an integration of multiple modules. The description of the functions of the modules of the file processing device may specifically refer to the corresponding description of the file processing method and may not be repeated here.

In addition, in practical applications, the functional modules of the file processing device in this embodiment of the present disclosure can be run in an intelligent terminal, i.e., a terminal equipment and/or a server, according to an actual application scenario.

An embodiment of the present disclosure provides an electronic apparatus, as shown in FIG. 19. The electronic apparatus 2000 shown in FIG. 19 comprises a processor 2001 and a memory 2003. The processor 2001 is connected to the memory 2003, for example, via a bus 2002. Optionally, the electronic apparatus 2000 can further comprise a transceiver 2004. It is to be noted that, in practical applications, the number of the transceiver 2004 is not limited to 1, and the structure of the electronic apparatus 2000 also does not constitute any limitations to the embodiment of the present disclosure.

The processor 2001 is applied in the embodiments of the present disclosure and configured to realize the functions the modules of the file processing device shown in FIG. 18. The transceiver 2004 comprises a receiver and a transmitter. The transceiver 2004 is applied in the embodiments of the present disclosure and configured to realize the communication between the electronic apparatus 2000 and another equipment to realize the reception and transmission of data.

The processor 2001 may be a CPU, a general-purpose processor, a DSP, an ASIC, an FPGA or other programmable logic devices, transistor logic devices or hardware components or any combinations thereof. The processor can implement or execute various logic blocks, modules and circuits described in the contents of the present disclosure. The processor 2001 can also be a combination for realizing a computation function, for example, a combination of one or more microprocessors, a combination of DSPs and microprocessors, or the more.

The bus 2002 can comprise a passageway for transferring information between the above components. The bus 2002 can be a PCI bus, an EISA bus, etc. The bus 2002 can be classified into an address bus, a data bus, a control bus, etc. For ease of expression, the bus is expressed by only one bold line in FIG. 19, but it does not mean that there is only one bus or one type of buses.

The memory 2003 can be, but not limited to, an ROM or other types of static storage devices capable of storing static information and instructions, an RAM or other types of dynamic storage devices capable of storing information and instructions, or an EEPROM, a CD-ROM or other optical disk storage, optical disc storage (including compact disc, laser disc, optical disc, digital versatile optical disc, Blu-ray disc, etc.), magnetic disk storage media or other magnetic storage apparatuses, or any other media that can be used to carry or store desired program codes in the form of instructions or data structures and that can be accessed by a computer.

Optionally, the memory 2003 is configured to store application codes for executing the solutions in the present application and is controlled by the processor 2001. The processor 2001 is configured to execute the application codes stored in the memory 2003 to implement actions of the device provided in the embodiments of the present disclosure.

An embodiment of the present disclosure provides a computer-readable storage medium storing computer programs that, when executed by a processor, enable the file processing method according to any one of the embodiments of the present disclosure.

It should be understood that, although the steps in the flowcharts in the accompanying drawings are described successively in an order indicated by the arrows, those steps may not be successively executed in the order indicated by the arrows. Unless otherwise stated, the execution of those steps is not limited to a specific order and they may be executed in other orders. Moreover, at least part of the steps in the flowcharts of the accompanying drawings may include a plurality of sub-steps or a plurality of sub-stages. Those sub-steps or sub-stages may be executed at different moments rather than at a same moment. Those sub-steps or sub-stages may not be executed successively, and instead, they may be executed alternately with other steps or with at least part of sub-steps or sub-stages of other steps.

The foregoing description are merely some implementations of the present disclosure. It should be noted that, for a person of ordinary skill in the art, various improvements and modifications can be made without departing from the principle of the present disclosure, and these improvements and modifications shall be regarded as falling into the protection scope of the present disclosure.

The invention claimed is:

1. A method for processing a file by a file processing device, comprising:
   determining, by a hardware processor of the file processing device, a target split ratio for at least two sub-files of a file by determining a first control quantity and a second control quantity of the target split ratio based on user-related information comprising at least one of user attribute information, user behavior related information, and user contact information of a user of the file processing device, wherein the first control quantity controls a ratio for a low-frequency portion to a high-frequency portion, and the second control quantity controls a ratio for a ratio for a high data bit to a low data bit;
   splitting, by the hardware processor, the file into the at least two sub-files based on the determined target split ratio;

receiving, by a transceiver of the file processing device, an operation request for the file, wherein the at least two sub-files of the file are separately stored in at least two equipments; and processing, by the hardware processor, at least one sub-file of the file based on the operation request, wherein, each sub-file of the file is obtained by splitting based on a frequency-domain feature or a data bit feature of the file, wherein, at least one sub-file of the file comprises at least one of:

a first portion or a second portion obtained by splitting based on a frequency-domain feature of the file, wherein, a frequency-domain feature value of a frequency-domain element of the second portion is greater than a frequency-domain feature value of a frequency-domain element of the first portion;

a third portion or a fourth portion obtained by splitting based on a data bit feature of the file, wherein a data bit of the fourth portion is higher than a data bit of the third portion;

a fifth portion and a sixth portion obtained by splitting based on a data bit feature of the first portion or a data bit feature of the second portion, wherein, a data bit of the fifth portion is higher than a data bit of the sixth portion; and a seventh portion and an eighth portion obtained by splitting based on a frequency-domain feature of a frequency-domain element of the third portion or a frequency-domain feature of a frequency-domain element of the fourth portion, wherein, a frequency-domain feature value of a frequency-domain element of the eighth portion is greater than a frequency-domain feature value of a frequency-domain element of the seventh portion.

2. The method of claim 1, wherein, a first sub-file comprising the first portion is stored locally, and a second sub-file comprising the second portion is stored in another equipment; or a fourth sub-file comprising the fourth portion is stored locally, and a third sub-file comprising the third portion is stored in another equipment; or a fifth sub-file comprising the fifth portion obtained based on the first portion is stored locally, and a sixth sub-file comprising the second portion and the sixth portion obtained based on the first portion is stored in another equipment; or a seventh sub-file comprising the first portion and the fifth portion obtained based on the second portion is stored locally, and an eighth sub-file comprising the sixth portion obtained based on the second portion is stored in another equipment; or a ninth sub-file comprising the seventh portion obtained based on the fourth portion is stored locally, and a tenth sub-file comprising the third portion and the eighth portion obtained based on the fourth portion is stored in another equipment; or an eleventh sub-file comprising the fourth portion and the seventh portion obtained based on the third portion is stored locally, and a twelfth sub-file comprising the eighth portion obtained based on the third portion is stored in another equipment.

3. The method of claim 1, wherein, each sub-file of the file is associated with at least one of:

file-related information of the file, equipment-related information of at least one equipment in which each sub-file of the file is stored, and the user-related information.

4. The method of claim 3, wherein, the file-related information comprises at least one of file type, file size, file tag, file level, file content, file operation information, file quality, file storage location; or the equipment-related information comprises at least one of storage space, battery level, network status, load condition.

5. The method of claim 1, further comprising:

when the file to be split is a split sub-file and a difference between the target split ratio and a current split ratio is greater than a set threshold, splitting a file before splitting corresponding to the file to be split.

6. The method of claim 1, wherein, determining the target split ratio comprises:

extracting feature information for at least one of file-related information of the file to be split, equipment-related information of the at least two equipments, and the user-related information; and determining the target split ratio by a deep learning network based on the extracted feature information.

7. The method of claim 6, wherein, the file to be split is at least one file determined based on at least one of:

the file-related information, the equipment-related information, and the user-related information.

8. The method of claim 7, further comprising:

transmitting at least one split sub-file to at least one another equipment for storage.

9. The method of claim 1, further comprising:

if at least one sub-file of the file is stored locally and at least one sub-file of the file is stored in another equipment, processing the at least one sub-file of the file comprises at least one of:

processing the at least one sub-file stored locally; and processing the at least one sub-file stored in another equipment.

10. The method of claim 9, wherein, processing the at least one sub-file stored in another equipment comprises at least one of:

acquiring the at least one sub-file of the file from another equipment and processing the acquired sub-file;

instructing the another equipment to process the at least one sub-file stored in the another equipment; and acquiring at least two sub-files stored in different equipments and merging the acquired at least two sub-files, wherein, acquiring the at least one sub-file of the file from the another equipment comprises at least one of:

acquiring the at least one sub-file of the file from the another equipment based on equipment-related information;

acquiring part or all contents of the at least one sub-file of the file from the another equipment; and acquiring the at least one sub-file of the file from the another equipment based on a link feature value corresponding to the file.

11. The method of claim 10, wherein, acquiring the at least one sub-file of the file from the another equipment based on equipment-related information comprises:

acquiring the at least one sub-file of the file from the another equipment when the equipment-related information of a local equipment or the another equipment in which a sub-file is stored meets a set processing condition, and wherein the equipment-related information comprises at least one of storage space, battery level, network status, load condition, wherein, the link feature value is associated with at least one of contents of the file, time information, user-related information, and equipment-related information, wherein, the operation request comprises at least one of browse, edit, delete, transmit and acquire.

12. The method of claim 9, wherein, the at least one sub-file stored in the another equipment is a sub-file encrypted based on contents of the at least one sub-file stored locally; and the method further comprises:

decrypting the at least one sub-file stored in the another equipment based on contents of the at least one sub-file stored locally, and determining that contents of the at least one sub-file stored locally do not change if the decryption is successful, wherein, the another equipment is a cloud server.

13. A file processing device for processing a file, the file processing device comprising:

at least one hardware processor configured to:

determine a target split ratio for the at least two sub-files of the file by determining a first control quantity and a second control quantity of the target split ratio based on user-related information comprising at least one of user attribute information, user behavior related information, and user contact information a user of the file processing device, wherein the first control quantity controls a ratio for a low-frequency portion to a high-frequency portion, and the second control quantity controls a ratio for a ratio for a high data bit to a low data bit, and split the file into the at least two sub-files based on the determined target split ratio; and a transceiver configured to receive an operation request for the file, wherein the at least two sub-files of the file are separately stored in at least two equipments, wherein the at least one hardware processor is further configured to process at least one sub-file of the file based on the operation request, wherein, each sub-file of the file is obtained by splitting based on a frequency-domain feature or a data bit feature of the file, wherein, at least one sub-file of the file comprises at least one of:

a first portion or a second portion obtained by splitting based on a frequency-domain feature of the file, wherein, a frequency-domain feature value of a frequency-domain element of the second portion is greater than a frequency-domain feature value of a frequency-domain element of the first portion;

a third portion or a fourth portion obtained by splitting based on a data bit feature of the file, wherein a data bit of the fourth portion is higher than a data bit of the third portion;

a fifth portion and a sixth portion obtained by splitting based on a data bit feature of the first portion or a data bit feature of the second portion, wherein, a data bit of the fifth portion is higher than a data bit of the sixth portion; and a seventh portion and an eighth portion obtained by splitting based on a frequency-domain feature of a frequency-domain element of the third portion or a frequency-domain feature of a frequency-domain element of the fourth portion, wherein, a frequency-domain feature value of a frequency-domain element of the eighth portion is greater than a frequency-domain feature value of a frequency-domain element of the seventh portion.

* * * * *